(12) United States Patent
Li et al.

(10) Patent No.: US 10,716,119 B2
(45) Date of Patent: Jul. 14, 2020

(54) SCHEDULING OF SUCCESSIVE MULTI-USER (MU) TRANSMISSIONS IN A WIRELESS LOCAL AREA NETWORK (LAN)

(71) Applicants: Hao Li, London (CA); Xianbin Wang, London (CA); Kwok Shum Au, Ottawa (CA); Osama Aboul-Magd, Ottawa (CA); Jung Hoon Suh, Ottawa (CA)

(72) Inventors: Hao Li, London (CA); Xianbin Wang, London (CA); Kwok Shum Au, Ottawa (CA); Osama Aboul-Magd, Ottawa (CA); Jung Hoon Suh, Ottawa (CA)

(73) Assignee: Huawei Technologies Canada Co., Ltd., Kanata (CA)

(*) Notice: Subject to any disclaimer, the term of this patent is extended or adjusted under 35 U.S.C. 154(b) by 0 days.

(21) Appl. No.: 16/029,907

(22) Filed: Jul. 9, 2018

(65) Prior Publication Data

US 2020/0015234 A1 Jan. 9, 2020

(51) Int. Cl.
*H04L 5/00* (2006.01)
*H04W 72/04* (2009.01)
*H04W 72/12* (2009.01)
*H04W 74/00* (2009.01)
*H04W 74/04* (2009.01)
(Continued)

(52) U.S. Cl.
CPC ....... *H04W 72/0486* (2013.01); *H04L 5/0053* (2013.01); *H04L 5/0078* (2013.01); *H04L 5/0094* (2013.01); *H04W 72/042* (2013.01); *H04W 72/1289* (2013.01); *H04W 74/006* (2013.01); *H04W 74/04* (2013.01); *H04W 84/12* (2013.01); *H04W 88/02* (2013.01); *H04W 88/08* (2013.01)

(58) Field of Classification Search
CPC . H04B 7/02–0495; H04L 5/003–0098; H04W 48/02–20; H04W 72/005–14; H04W 74/002–06; H04W 84/12; H04W 88/02; H04W 88/08
See application file for complete search history.

(56) References Cited

U.S. PATENT DOCUMENTS

2016/0219573 A1* 7/2016 Ghosh ............... H04L 5/0007
370/329
2016/0345349 A1* 11/2016 Ferdowsi .......... H04W 72/1268
370/336

OTHER PUBLICATIONS

IEEE, Standard IEEE Std P802.11ax.Part 11: Wireless LAN Medium Access Control (MAC) and Physical Layer (PHY) specifications: Enhancements for High Efficiency WLAN, Draft Standard, Feb. 2018.

(Continued)

*Primary Examiner* — Timothy J Weidner

(57) ABSTRACT

Methods and systems for scheduling successive transmissions in a wireless local area network (WLAN). An Access Point (AP) can generate a control signal that includes an identifier field for indicating that previous resource allocation from a previous transmission is to be repeated, and therefore the control signal itself does not contain resource allocation information. One or more stations (STAs) can receive the control signal and can use the previous resource allocation information stored in their respective memory to perform the transmission. The resource allocation can include three-dimensional (3D) resource allocation, which refers to time, frequency and space-domain multiplexing. Because the control signal has the identifier field, the AP can reduce network load and free resources for payload data or other traffic.

16 Claims, 14 Drawing Sheets

(51) Int. Cl.
H04W 84/12 (2009.01)
H04W 88/02 (2009.01)
H04W 88/08 (2009.01)

(56) References Cited

OTHER PUBLICATIONS

J. Gross et al., "The Signaling Overhead in Dynamic OFDMA Systems: Reduction by Exploiting Frequency Correlation", 2007 IEEE International Conference on Communications, Jun. 2007.

J. So, "Performance Analysis of a Semi-Fixed Mapping Scheme for VoIP Services in Wireless OFDMA Systems", 2009 Fifth International Conference on Wireless and Mobile Communications, Aug. 2009.

R. Moosavi et al., "Differential Signaling of Scheduling Information in Wireless Multiple Access Systems", 2010 IEEE Global Telecommunications Conference GLOBECOME 2010, Dec. 2010.

X. Wang et al., "A New Adaptive OFDM System with Precoded Cyclic Prefix for Dynamic Cognitive Radio Communications", IEEE Journal on Selected Areas in Communications, vol. 29, No. 2, Feb. 2011.

* cited by examiner

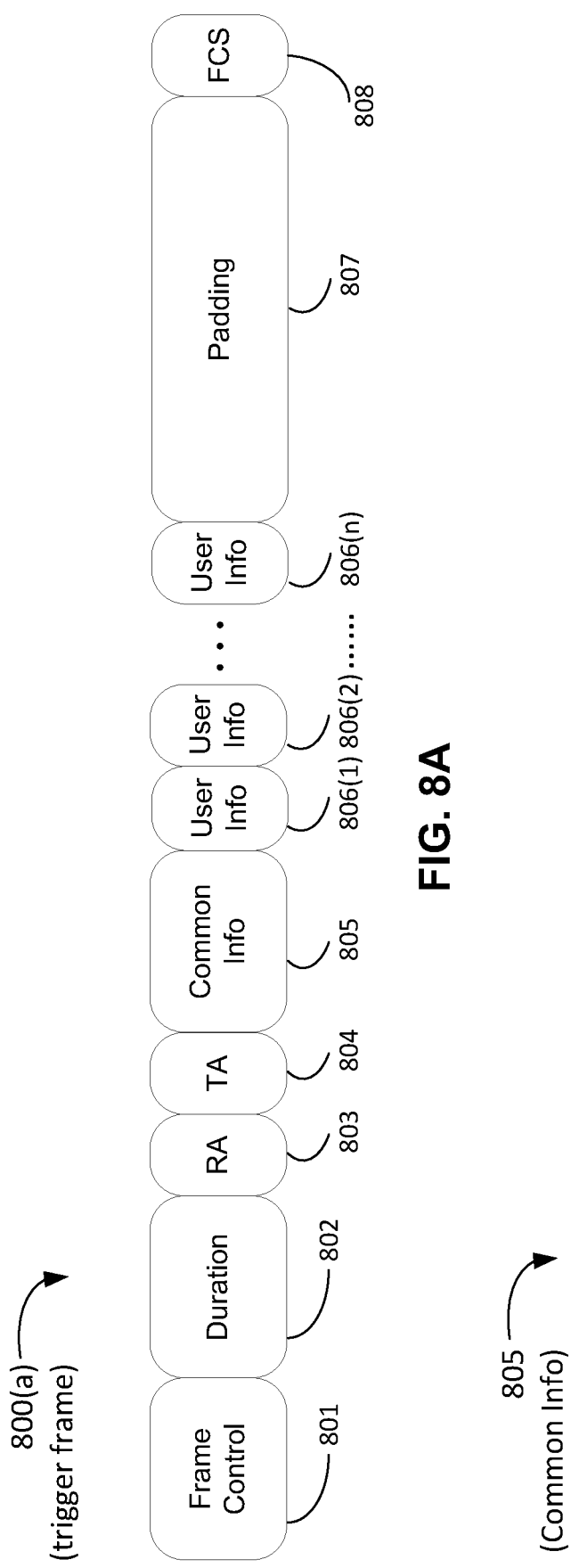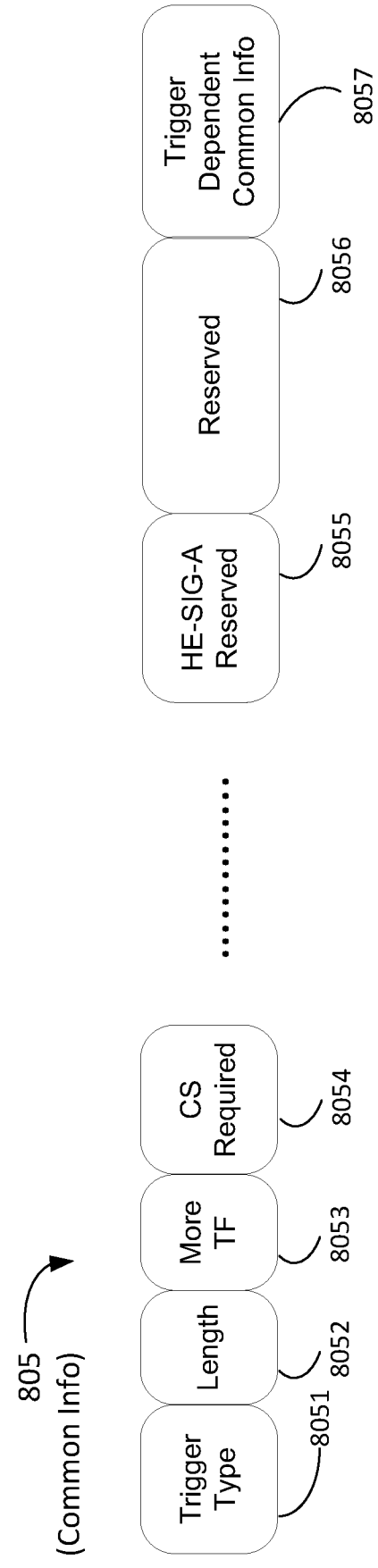
FIG. 8A
FIG. 8B

SCHEDULING OF SUCCESSIVE MULTI-USER (MU) TRANSMISSIONS IN A WIRELESS LOCAL AREA NETWORK (LAN)

TECHNICAL FIELD

Example embodiments relate to wireless communications, in particular methods and systems for scheduling successive transmissions in a wireless local area network (WLAN).

BACKGROUND

Wireless communication technologies are used for providing multiple users with convenient access to services and network connectivity. Recent wireless local area network (WLAN) communication technologies have been proposed by the Institute of Electrical and Electronics Engineers (IEEE). Groups related to the IEEE 802.11 family of standards are developing and commercializing standards that relate to WLANs and their quality-of-service (QoS) improvement, access point protocol, security enhancement, wireless management, etc.

The draft proposed IEEE 802.11ax WLAN standard, also known as high efficiency wireless (HEW), seeks to improve WLAN performance to better support a variety of applications such as video, cloud access, and offloading in diverse environments. To provide high efficiency of WLANs in dense deployments, the IEEE 802.11ax WLAN standard introduces three-dimensional (3D) multiplexing, i.e. time, frequency and space-domain multiplexing, based on multi-user multiple-input-multiple-output (MU-MIMO) and non-MU-MIMO technologies. Real-time control signaling is transmitted from an access point (AP) to a plurality of stations (STAs) to schedule resource allocation for a transmission.

Each control signal may include 3D resource allocation information, which refers to resource allocation of time, frequency and space-domain. This 3D resource allocation information is transmitted from the AP for real time scheduling of transmissions. However, this 3D resource allocation information results in high signaling overhead that could be otherwise used for other traffic or payload data transmission.

Thus, solutions for improving communication efficiency are desired to reduce network overhead and increase resources for payload data transmission in wireless communication systems.

SUMMARY

Example embodiments include methods, systems, and wireless communication apparatuses that can schedule successive downlink (DL) or uplink (UL) multi-user (MU) transmissions in a wireless local area network (WLAN). An Access Point (AP) can determine that previous resource allocation is to be repeated for a transmission. The AP can generate a control signal that includes an identifier field for indicating that previous resource allocation from a previous transmission is to be repeated, and therefore the control signal itself does not need to contain resource allocation information. When the previous resource allocation is to be repeated, the identifier field is populated with an indication. For DL direction, a DL transmission is transmitted that includes both the control signal and payload data. For UL direction, the control signal is transmitted as a trigger frame to solicit a subsequent UL transmission. When the control signal, having the indication, is received by one or more stations (STAs), the STAs can use previous resource allocation information stored in memory of the STA to perform the DL or UL transmission. The resource allocation information can include three-dimensional (3D) resource allocation information, which refers to time, frequency and space-domain multiplexing. Because the indication of the control signal indicates that the previous resource allocation is to be repeated, and the control signal contains no resource allocation information, the control signal uses less network resources. The control signal improves overall network load, especially for 3D multiplexing resource allocation information scheduling. More available resources means that payload data or other signaling information can be transmitted with those available resources.

An example embodiment is a method for scheduling wireless transmissions, performed by an access point (AP), the method including: determining that a previous resource allocation used for a previous transmission is to be repeated for a transmission; generating a control signal for the transmission, the control signal including an indication that there is no resource allocation field within the control signal; and transmitting the control signal.

In another example embodiment of the method, resource allocation information for the previous resource allocation was transmitted by the AP in a previous control signal.

In another example embodiment of any of the above methods, the resource allocation information includes resource assignment parameters and transmission parameters.

In another example embodiment of any of the above methods, the transmission includes the control signal and payload data.

In another example embodiment of any of the above methods, the method further includes receiving the transmission and demodulating and decoding the transmission according to the previous resource allocation.

In another example embodiment of any of the above methods, the transmission is a downlink (DL) high efficiency (HE) Physical Layer Convergence Procedure (PLCP) Protocol Data Unit (PPDU) frame, wherein the DL HE PPDU frame includes the control signal, and wherein the indication is for indicating that there is no HE signal-B (SIG-B) field in the DL HE PPDU frame.

In another example embodiment of any of the above methods, the AP includes a memory for storing resource allocation information for the previous resource allocation, the resource allocation information being from a HE-SIG-B field of the previous transmission.

In another example embodiment of any of the above methods, the DL HE PPDU frame includes a HE signal-A (SIG-A) field, wherein the indication is included in the HE SIG-A field.

In another example embodiment of any of the above methods, the indication is in bit positions 18 to 21 of the HE SIG-A field.

In another example embodiment of any of the above methods, the indication in the bit positions 18 to 21 is "1111".

In another example embodiment of any of the above methods, the transmission is an uplink (UL) transmission, wherein the control signal is a trigger frame that includes a reserved subfield, wherein the indication is included in the reserved subfield.

In another example embodiment of any of the above methods, the reserved subfield is bit position 63 of the trigger frame.

In another example embodiment of any of the above methods, transmitting the control signal comprises broadcasting the control signal.

Another example embodiment is a method for wireless transmissions, performed by a station (STA), the STA including a memory for storing previous resource allocation information used for a previous transmission, the method includes: receiving a control signal from an access point (AP), the control signal including an indication that there is no resource allocation field within the control signal; and performing a transmission according to the previous resource allocation information stored in the memory.

In another example embodiment of the method performed by the STA, the memory is for storing the previous resource allocation information from one or more sub-fields of a high efficiency (HE) signal-B (SIG-B) field of the previous transmission.

In another example embodiment of any of the above methods performed by the STA, the memory is for storing the previous resource allocation information from one user specific subfield of a HE-SIG-B field of the previous transmission, wherein the one user specific subfield provides resource allocation information specifically for the STA and not any other user specific subfields.

Another example embodiment is a wireless communication apparatus, including: a transmitter; a processing device; a memory associated with the processing device for storing previous resource allocation information used for a previous transmission, the memory storing instructions that when executed by the processing device causes the processing device to: determine that previous resource allocation information used for a previous transmission is to be repeated for a transmission, generate a control signal for the transmission, the control signal including an indication that there is no resource allocation field within the control signal, and transmit the control signal.

In another example embodiment of the wireless communication apparatus, the transmission is a high efficiency (HE) Physical Layer Convergence Procedure (PLCP) Protocol Data Unit (PPDU) frame that includes the control signal, wherein the previous resource allocation information is from a HE signal-B (SIG-B) field of the previous transmission.

Another example embodiment is a wireless communication apparatus, including: a processing device; a memory associated with the processing device for storing previous resource allocation information used for a previous transmission, the memory storing instructions that when executed by the processing device causes the processing device to: receive a control signal from an access point (AP), the control signal including an identifier field, determine that the identifier field of the control signal includes an indication that there is no resource allocation field within the control signal, and perform a transmission according to the previous resource allocation information stored in the memory that was used for the previous transmission.

Another example embodiment is a method for generating and transmitting a DL HE PPDU frame that includes the control signal and payload data, and wherein there is no HE SIG-B field in the DL HE PPDU frame when the previous resource allocation is to be repeated.

Another example embodiment is a method for generating and transmitting the control signal in the form of a trigger frame for UL transmission, wherein the trigger frame has a reserved subfield that is used as the identifier field, and wherein there is no User Information field in the trigger frame when the previous resource allocation is to be repeated.

BRIEF DESCRIPTION OF THE DRAWINGS

For a more complete understanding of the present invention, and the advantages thereof, reference is now made to the following description taken in conjunction with the accompanying drawings, in which:

FIG. 8A is a conventional format of trigger frame for soliciting UL HE trigger-based (TB) PPDU transmission in 802.11ax;

FIG. 8B is a Common Info field of the trigger frame of FIG. 8A;

Similar reference numerals may have been used in different figures to denote similar components.

DETAILED DESCRIPTION OF ILLUSTRATIVE EMBODIMENTS

In wireless communication systems, transmission of control signals for uplink (UL) or downlink (DL) multi-user (MU) transmissions can use valuable network resources that may be otherwise used for payload data and other signals. In example embodiments, an Access Point (AP) can generate a control signal that includes an identifier field for indicating that previous resource allocation is to be repeated. The DL transmission and the UL transmission are payload transmissions. For DL transmission, a DL frame is transmitted that includes both the control signal and payload data. For UL transmission, the control signal is transmitted as a trigger frame to solicit a subsequent UL transmission. When the previous resource allocation is to be repeated, the identifier field is populated with an indication and the control signal does not include resource allocation information. When the indication is included in the control signal, one or more stations (STAs) can use previous resource allocation information stored in their respective memory to perform their UL or DL transmission in accordance with the previous resource allocation that was used for a previous transmission. Example embodiments of methods and systems herein can reduce network overhead in wireless communication systems, such as wireless local area networks (WLANs), to improve network load, spectrum efficiency and link reliability.

Figure 1:
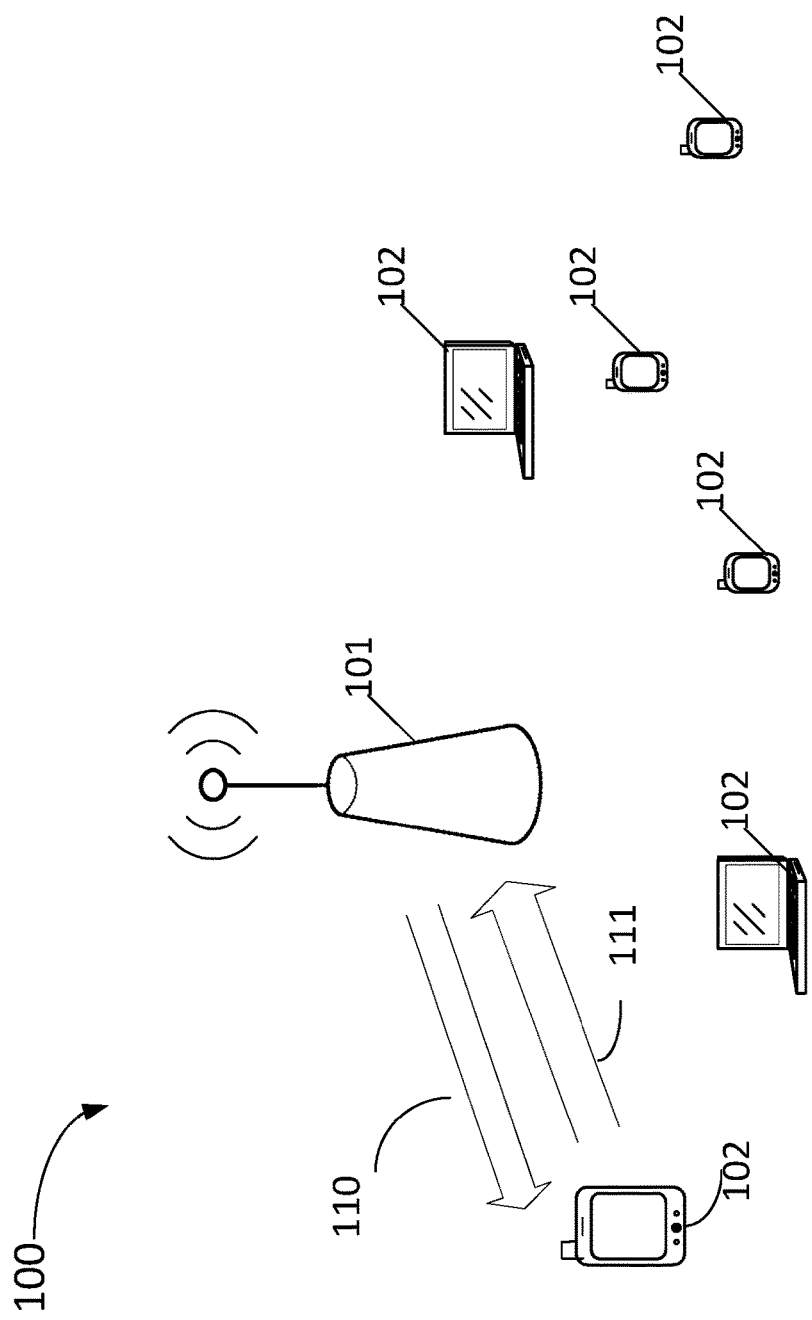
FIG. 1 is a schematic diagram illustrating a wireless communication system according to example embodiments.

FIG. 1 provides an example schematic diagram of a wireless communication system 100 in which example embodiments can be applied. The wireless communication system 100 includes an AP 101 (also known as AP STA) and at least one station (STA) 102 (also known as non-AP STA) in a wireless communication network, such as a WLAN. The AP 101 provides associated STAs with wireless access to the Internet or a distribution service. The STAs 102 may be mobile communication apparatuses enabled for wireless communications, including but not limited to mobile phones, smart phones, laptops, tablet computers, machine-type communication devices, Internet of Things (IoT) devices, and wireless sensing and reporting devices. The AP 101 can access the Internet backbone or distribution service by way of wired or wireless communication.

Referring to FIG. 1, a transmission from the AP 101 to one or more STAs 102 is referred to as downlink (DL) transmission 110. A transmission from any one of the STAs 102 to the AP 101 is referred to as uplink (UL) transmission 111. Although only one AP 101 is illustrated, in some examples, there may be more than one AP within the wireless communication system 100.

For the UL transmission 111 or DL transmission 110, the AP 101 can generate and transmit a control signal that includes resource allocation information, in order to inform each STA 102 of their resource allocation information for the UL transmission 111 or DL transmission 110. In some examples, the resource allocation information may include, for each of the STAs 102, resource assignment parameters for each STA 102 and transmission parameters. The resource allocation information may refer to, for example, frequency, time and space resource to be used by each STA 102 for a transmission (collectively 3D resource allocation information). The transmission parameters may refer to, for example, orthogonal frequency-division multiple access (OFDMA) parameters or multi-user multiple input multiple output (MU-MIMO) parameters.

Due to the required real-time scheduling between the AP 101 and the plurality of STAs 102, the sending of resource allocation fields in all control signals that initiate each UL transmission 111 or DL transmission 110 would result in high network overhead, which is not desired.

Figure 2:
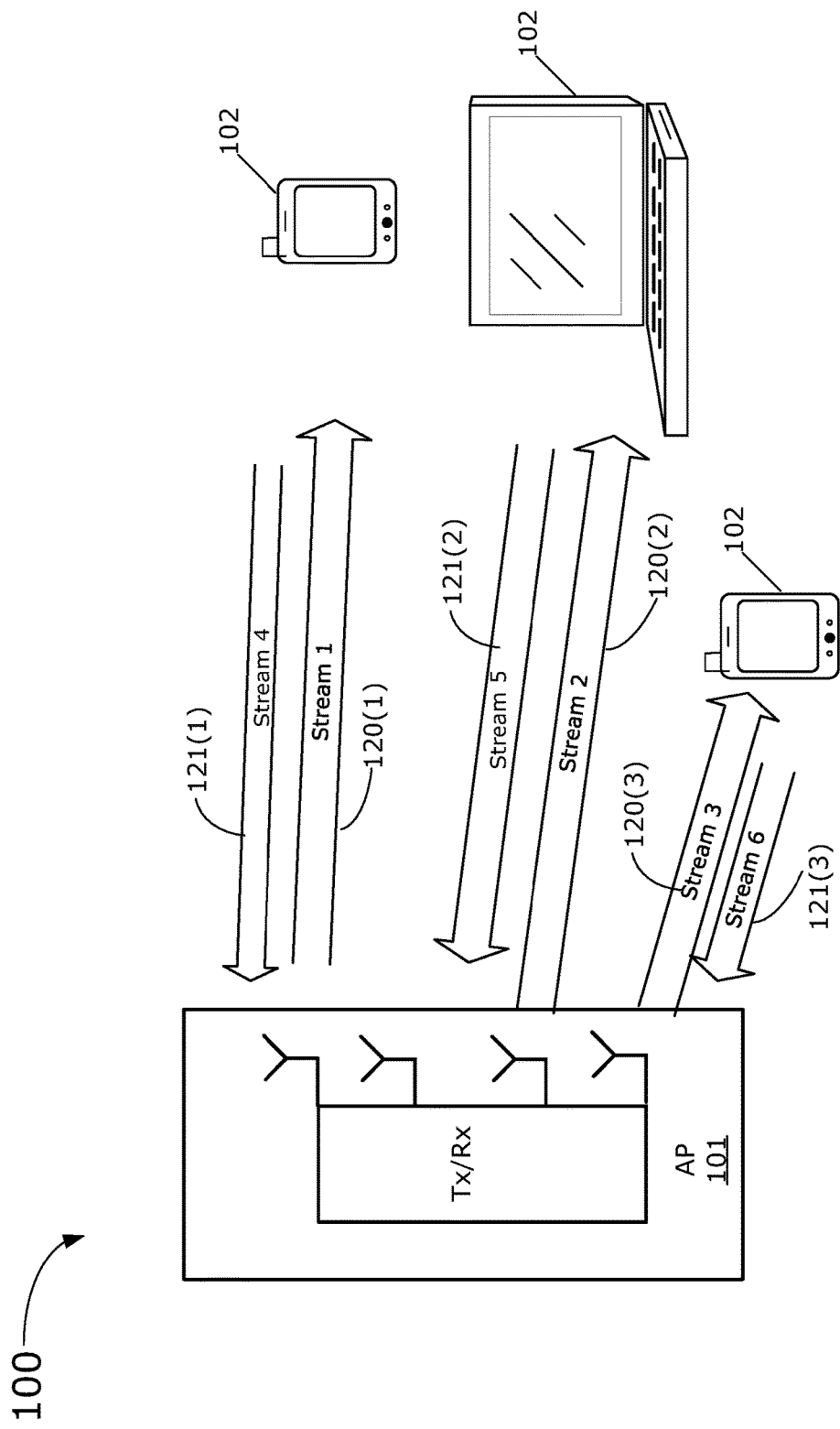
FIG. 2 is a schematic diagram of a MU-MIMO WLAN system for downlink (DL) and uplink (UL) multiple access communications according to example embodiments.

Reference is now made to FIG. 2, which illustrates an example wireless communication system 100 for multiple access communications between a plurality of STAs 102 and the AP 101. Multiple access communication systems are used to enable efficient spectrum access in dense deployment. In FIG. 2, the wireless communication system 100 supports MU-MIMO and OFDMA based transmissions. The AP 101 allows simultaneous channel access by the plurality of STAs 102 to the WLAN. The AP 101 can simultaneously transmit spatial-multiplexed data to the plurality of STAs 102. In the DL direction, transmission can be made from the AP 101 to the plurality of STAs 102 using a plurality of respective spatial streams (stream 1, 2, 3 shown in FIG. 2), referred to as DL MU transmissions 120(1), 120(2), 120(3) (generically referred to as DL MU transmission 120). Transmission in the UL direction is referred to as UL MU transmissions 121(1), 121(2), 121(3) (generically referred to as UL MU transmission 121), and uses a plurality of respective spatial streams (stream 4, 5, 6 shown in FIG. 2). The DL MU transmissions 120 and the UL MU transmissions 121 contain payload data. The DL MU transmissions 120 and the UL MU transmissions 121 may be an OFDMA transmission, with or without MU-MIMO, to support multiple spectrum band access.

The proposed IEEE 802.11 lax standard introduces a three-dimensional (3D) multiplexing technology, which provides high efficient WLANs to address challenges of wireless networking in dense indoor and outdoor deployment. The 3D resource allocation information includes time, frequency, and space-domain multiplexing. Conventional OFDMA and MU-MIMO transmission in WLANs require real-time scheduling of resource allocation between the AP 101 and the plurality of STAs 102. Network overhead between the AP 101 and the plurality of STAs 102 are costly and resource consuming if 3D resource allocation information is transmitted for each UL or DL transmission.

For example, in conventional DL MU transmission, the resource allocation information for the transmission is included in the preamble of each DL frame and specifies 3D resource allocation information, which increases signaling overhead. In conventional UL MU transmission, a control signal (e.g. in the form of a trigger frame) includes resource allocation information for each UL transmission, and the control signal is broadcasted by the AP 101 prior to each UL transmission. In the conventional case, each trigger frame used to solicit UL transmissions contains the resource allocation information, which may result in wastage of resources. Therefore, conventional UL and DL MU transmissions can cause excessive resource consumption and inefficient spectrum usage.

Methods and systems in accordance with various example embodiments can be used to reduce the amount of network overhead in successive UL or DL MU transmissions to support multiple access communication systems in dense deployment, and may address at least some drawbacks of the above-discussed conventional approaches. The methods and systems may be used in various applications and scenarios, including DL MU transmission and UL MU transmission, in accordance with example embodiments.

In DL MU transmission, the AP 101 can generate and transmit a control signal to distribute resource allocation information, which includes 3D resource allocation information (i.e., time, frequency, and space-domain resources), and transmission parameters, to the plurality of STAs 102. A multi-user (MU) Physical Layer Convergence Procedure (PLCP) Protocol Data Unit (PPDU) frame, such as a DL High Efficiency (HE) MU PPDU frame, is capable of carrying one or more physical layer (PHY) service data units (PSDUs) for one or more STAs 102. The DL High Efficiency (HE) MU PPDU frame is transmitted from the AP 101 to the plurality of STAs 102 for scheduling resource allocation in the DL MU transmission. The DL MU transmission can be a DL OFDMA PPDU transmission, with or without MU-MIMO.

Figure 3A:
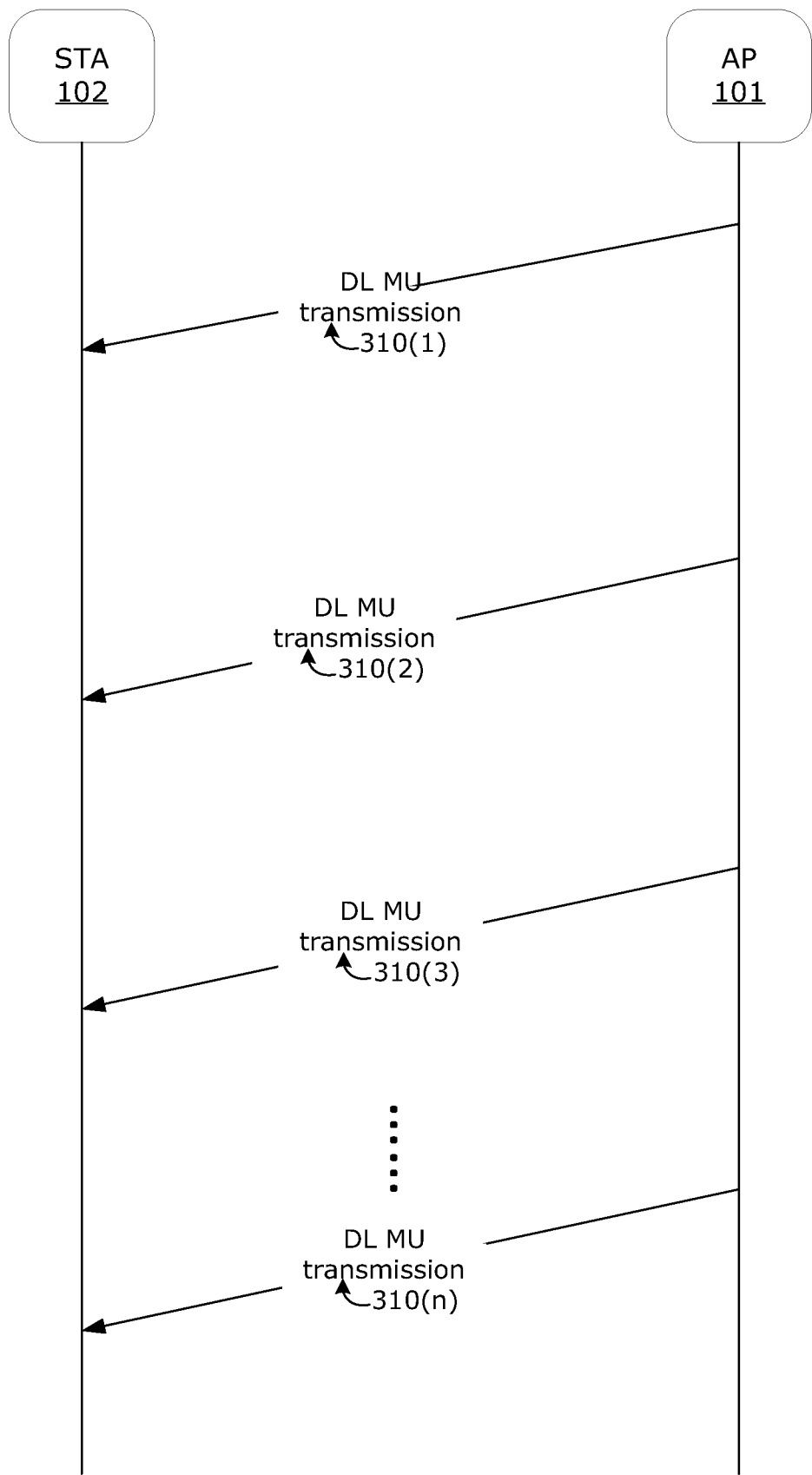
FIG. 3A is a schematic diagram of transmissions between an AP and a STA illustrating successive DL multi-user (MU) transmissions according to example embodiments.

FIG. 3A shows successive (consecutive) DL MU transmissions 310(1), 310(2), 310(3), . . . , to 310(n) (generically referred to as DL MU transmission 310) from an AP 101 and each STA 102 using successive HE MU PPDU frames. Although only one STA 102 is illustrated in the FIG. 3A to implement successive DL MU transmissions, in other examples, a plurality of STAs may participate in successive DL MU transmissions. In other examples, the successive DL MU transmissions may use any other suitable PPDU frames and may have different configurations. In some examples, formats of each of the successive DL HE MU PPDU frame 310 are different. In other examples, the formats of each of the successive DL HE MU PPDU frames 310 are the same. Example formats of the DL HE MU PPDU frames are described in greater detail below.

Figure 3B:
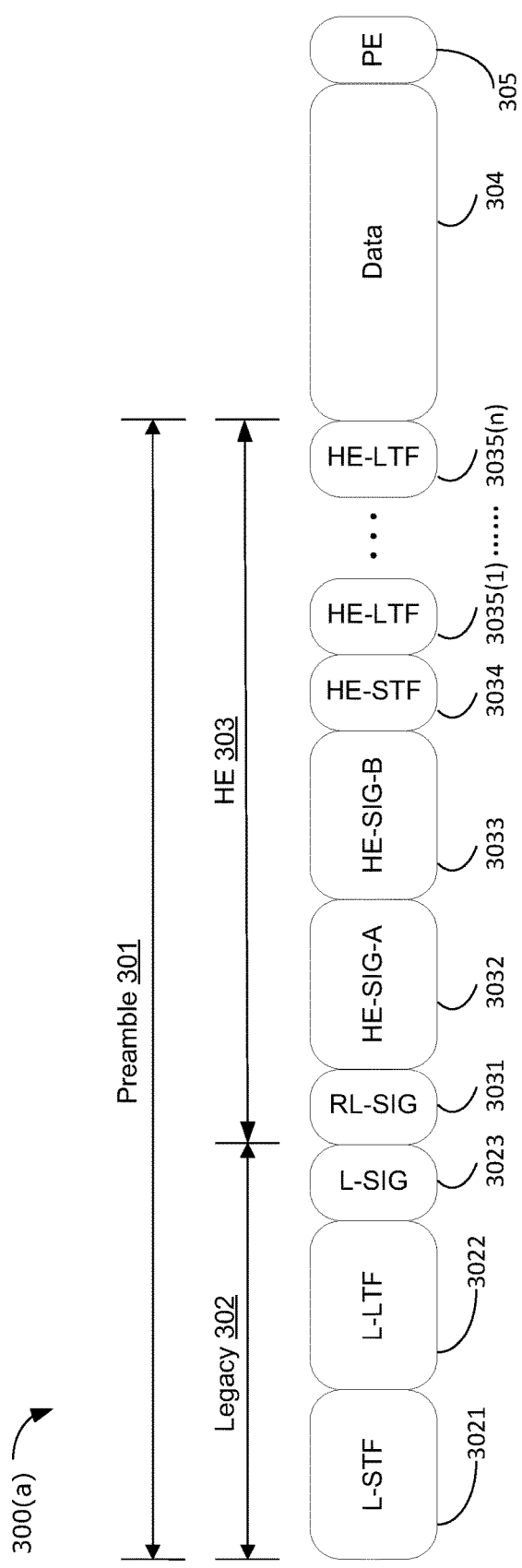
FIG. 3B is a conventional format of DL high efficiency (HE) MU Physical Layer Convergence Procedure (PLCP) Protocol Data Unit (PPDU) frame in 802.11ax.

A conventional HE MU PPDU frame having resource allocation information as defined in PHY 802.11ax is shown in FIG. 3B. The HE MU PPDU frame 300(a) includes a preamble 301 (control signal) having a legacy portion 302 and a HE portion 303. The legacy portion 302 for the HE MU PPDU frame 300 incorporates a legacy short training field (L-STF) 3021, a legacy long training field (L-LTF) 3022, and a legacy signal (L-SIG) field 3023. The HE portion 303 includes a repeated legacy signal (RL-SIG) field 3031, a HE Signal A (HE-SIG-A) field 3032, a HE Signal B (HE-SIG-B) field 3033, a HE short training field (HE-STF) 3034, and a plurality of HE long training fields (HE-LTFs) 3035(1) to 3035(n) (generically referred to as HE-LTF 3035). The HE MU PPDU frame 300 also includes a data field 304 and a packet extension (PE) field 305. In the legacy portion 302, the L-STF 3021 and the L-LTF 3022 are used for time domain and frequency domain synchronization. The L-SIG field 3023 is used to communicate rate and length information, which may include a length subfield and a rate subfield. In the HE portion 303, the RL-SIG 3031 is a repeat of the L-SIG field 3023 and is used to differentiate the HE MU PPDU from a non-high throughput (HT) PPDU, HT PPDU, and very high throughput (VHT) PPDU. The HE-SIG-A field 3032 carries information necessary to demodulate and decode the HE MU PPDU 300(a). The HE-SIG-B field 3033 provides an OFDMA alone (without MU-MIMO) resource allocation field, or OFDMA with MU-MIMO resource allocation field, to allow the STAs to demodulate and decode the data field 304 of the HE MU PPDU frame 300(a). The HE-STF 3034 and the plurality of HE-LTFs 3035 are used for channel estimation and MIMO training. The data field 304 contains payload data carrying physical layer service data units (PSDUs) for one or more STAs 102. The data field 304 may also be referred to as a payload data field, and includes data or payload. Example configurations of the HE-SIG-A field 3032 and the HE-SIG-B field 3033 are described in greater detail below.

Figure 3C:
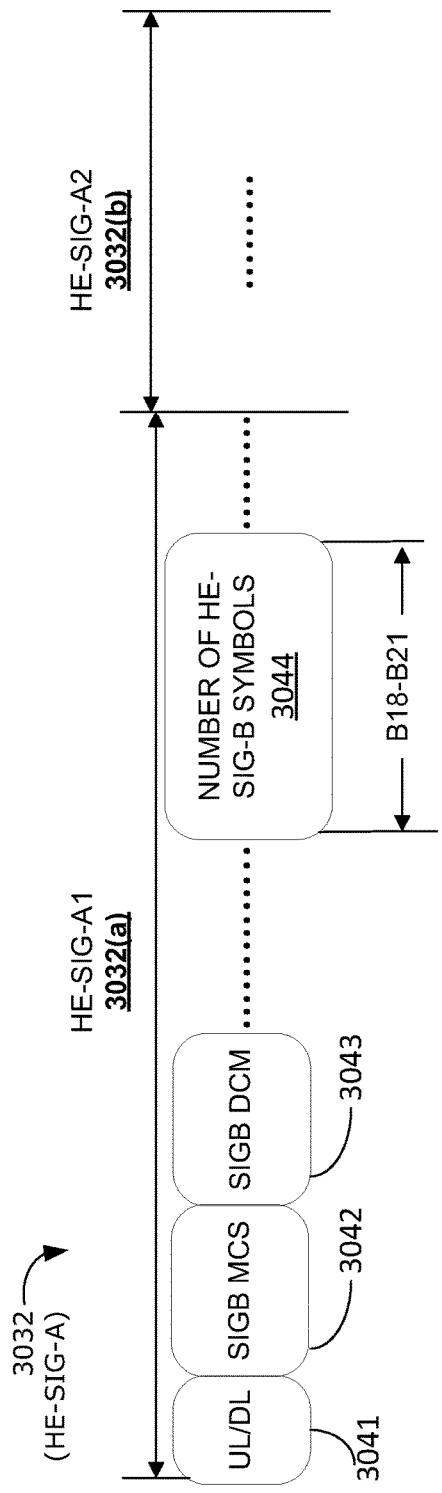
FIG. 3C is a HE Signal A (HE-SIG-A) field of the DL HE MU PPDU frame of FIG. 3B.

FIG. 3C illustrates in greater detail two parts of the HE-SIG-A field 3032 that are within the HE MU PPDU frame 300. The first part is HE-SIG-A1 field 3032(a), which occupies bits B0-B25, and the second part is HE-SIG-A2 field 3032(b), which includes bits B0-B25. The HE-SIG-A1 3032(a) may include the following subfields: information on a frequency bandwidth mode, modulation and coding scheme (MCS), number of space time streams (N-STS), and other information. As shown in FIG. 3C, the HE-SIG-A1 field 3032(a) includes UL/DL subfield 3041, signal B (SIGB) modulation and coding scheme (MCS) subfield 3042, SIGB dual sub-carrier modulation (DCM) subfield 3043, and Number of HE-SIG-B Symbols subfield 3044. The SIGB MCS subfield 3042, occupying 3 bits from B1 to B3, indicates the MCS of the HE-SIG-B field 3033. The SIGB DCM subfield 3043, occupying one bit B4, indicates whether the HE-SIG-B field 3033 is modulated with dual sub-carrier modulation for the MCS.

The Number of HE-SIG-B Symbols subfield 3044 occupies the 4 bit positions B18-B21 within the HE-SIG-A field 3032, and conventionally indicates the number of OFDMA symbols in HE-SIG-B field 3033 or the number of MU-MIMO users. Note that "1111" in field 3032 is not used for either of these cases, and therefore "1111" can be used as the indication for indicating that a previous resource allocation is to be repeated, in accordance with example embodiments.

Figures 3D, 3E, 3F:
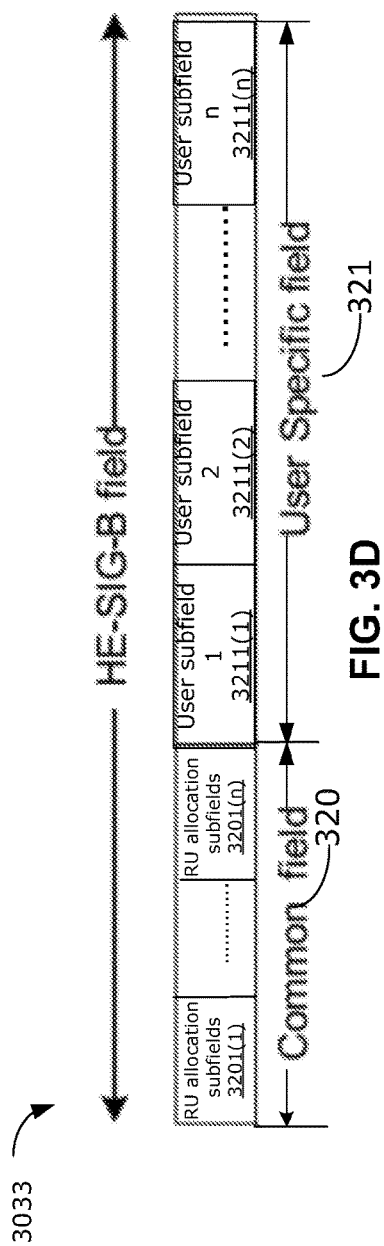
FIG. 3D is a HE Signal B (HE-SIG-B) field of the DL HE MU PPDU frame of FIG. 3B.
FIGS. 3E and 3F illustrate contents of a user specific subfield of the HE-SIG-B field of FIG. 3D, for non-MU-MIMO and MU-MIMO, respectively.

FIG. 3D defines an example format of HE-SIG-B field 3033, which is typically separately encoded on each 20 MHz band. The HE-SIGB field 3033 may contain resource allocation information used for interpretation and decoding of the data field 304 of the HE MU PPDU frame 300(a). For example, the received payload data of data field 304 can be demodulated and decoded by each STA 102 using the resource allocation information. The HE-SIG-B field 3033 may also provide Resource Unit (RU) allocation subfields (3201(1) to 3201(n), generically referred to as RU allocation subfield 3201) so that each scheduled STA 102 can demodulate and decode the payload data received through one or more assigned resource units (RUs). A RU is a distinct set of subcarriers or tones, typically allocated by the AP 101 to an individual STA 102.

As shown in FIG. 3D, the HE-SIG-B field 3033 includes a common field 320 followed by a user specific field 321. The common field 320 of the HE-SIG-B field 3033 carries resource unit (RU) allocation subfields 3201 which contains information regarding RU assignment to be used in the data field 304 in the frequency domain, the RUs allocated for MU-MIMO and the number of STAs in MU-MIMO allocations. The common field 320 can contain multiple RU allocation subfields 3201(1) to 3201(n), as shown.

The user specific field 321 includes multiple user specific subfields 3211(1) to 3211(n) (generically referred to as user specific subfield 3211 or user subfield 3211). The RU allocation subfields in the common field 320 and the particular user specific subfield 3211 together identify the RU used to transmit data to a STA 102. Contents of each user specific subfield 3211 can differ with respect to each other. The contents of each user specific subfield 3211 can be OFDMA only without MU-MIMO allocation, or a MU-MIMO allocation, or other suitable RU allocations. The size of each user specific subfield 3211 is the same irrespective of whether the RU allocation is MU-MIMO allocation or without MU-MIMO allocation (such as OFDMA only) in a RU, the size of each user specific subfield 3211 being 21 bits.

Different example formats of the user specific subfield 3211 are shown in FIGS. 3E and 3F, which respectively illustrate the user specific subfield for an OFDMA only subfield 3300 without MU-MIMO allocation (FIG. 3E) and a MU-MIMO subfield 3400 (FIG. 3F). The contents of the OFDMA only subfield 3300 and the MU-MIMO subfield 3400 are different, but the size of each user specific subfield is the same, being 21 bits in the B0-B20 bit positions. The OFDMA only subfield 3300 includes a transmit beamforming (TxBF) subfield 3317 which indicates use of transmit beamforming. The remaining subfields of the OFDMA only subfield 3300 and the MU-MIMO subfield 3400 are the same. The OFMDA only subfield 3300 includes a station identifier (STA-ID) subfield 3312, number of space-time streams subfield (N-STS) 3313, modulation and coding scheme (MCS) subfield 3314, dual carrier modulation (DCM) subfield 3315, and coding subfield 3316. The STA- ID subfield 3312 indicates which STAs are the recipient of the transmitted HE MU PPDU 300(*a*). The MCS subfield 3314 indicates the modulation and coding scheme used. The DCM subfield 3315 indicates whether or not dual carrier modulation is used. The coding subfield 3316 indicates whether binary convolutional code (BBC) or low density parity check (LDPC) code is used. The MU MIMO subfield 3400 includes a station identifier (STA-ID) subfield 3412, number of space-time streams (N-STS) subfield 3413, modulation and coding scheme (MCS) subfield 3414, dual carrier modulation (DCM) subfield 3415, and coding subfield 3416.

In conventional approaches to transmit a control signal in a DL MU transmission, the HE-SIG-B field 3033 (FIG. 3D) is included within the HE MU PPDU frame 300(*a*) to inform each of the STAs of the resource allocation information (e.g., RU allocation and transmission parameters). The HE-SIG-B field 3033 occupies up to 64 microseconds, consuming resources (such as time duration, data resources) in the HE MU PPDU frame 300(*a*). In DL transmissions, transmitting the HE-SIG-B field 3033 within each HE MU PPDU frame 300(*a*) is inefficient and can lead to increased network overhead.

Methods and apparatuses in accordance with example embodiments implement successive DL MU transmissions by reducing occurrences of the resource allocation field in the control signal. The indication in the identifier field of the control signal indicates that the resource allocation field is not included within the control signal, and informs each associated STA that the previous resource allocation is to be repeated in the DL MU transmission. Sending of the indication reduces network load and provides available for increased data throughput in the successive DL MU transmissions.

With reference again to FIG. 3A, the AP 101 can generate and transmit DL MU transmissions 310 having the control signal. In some examples, not shown here, after the STA 102 receives the DL MU transmission 310(1) from the AP 101, the STA 102 transmits an Acknowledgement (ACK) to the AP 101, in order to confirm with the AP 101 that the DL MU transmission 310(1) has been received successfully. The AP 101 transmits the next DL MU transmission 310(2) to the STA 102. Therefore, between each of the DL MU transmissions 310(2) . . . 310(*n*), the AP 101 may receive an ACK which indicates that the previous DL MU transmission has been received successfully.

Figure 5:
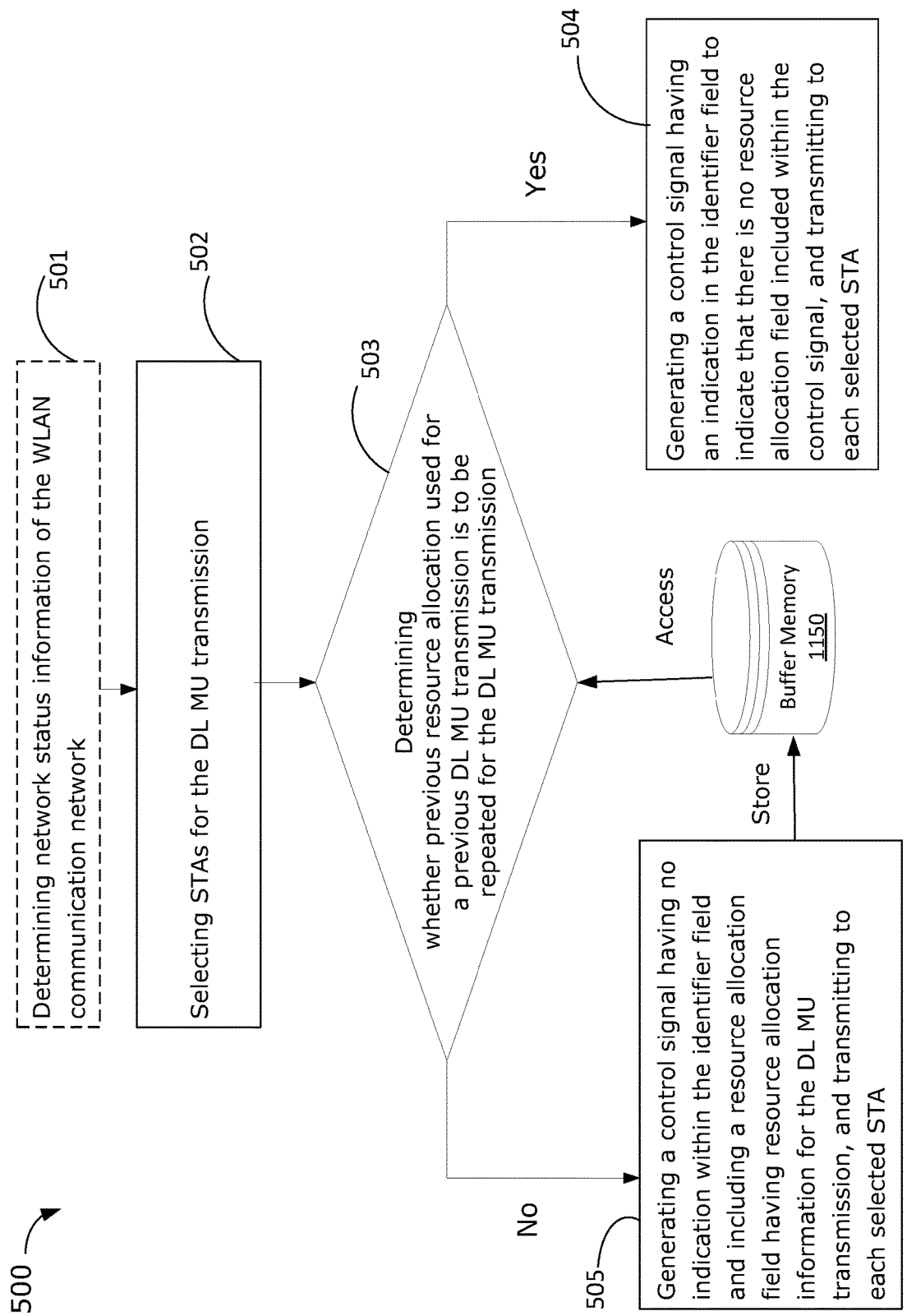
FIG. 5 illustrates an example method implemented by an AP for performing a DL MU transmission, in accordance with an example embodiment.

FIG. 5 illustrates an example method 500 implemented by the AP 101 for generating a DL MU transmission (e.g., DL MU transmission 310(2) in FIG. 3A) that includes the control signal. At step 501, optionally, the AP 101 determines the network status information of the WLAN. The AP 101 receives status information from each STA 102 in order to determine the network status information. The network status information includes transmission channel conditions and traffic needs of the WLAN. For example, the AP 101 determines which STAs 102 are associated with the AP 101, which frequency channels and spatial streams will be used for the transmission. At step 502, the network status information is used by the AP 101 to select which STAs 102 are to receive the DL MU transmission 310(2).

At step 503, the AP 101 determines whether previous resource allocation used for the last preceding DL MU transmission 310(1) is to be repeated for the DL MU transmission 310(2). For example, when the selected STAs 102 and their spatial positions are the same as in the DL MU transmission 310(1), the resource allocation is to be repeated. In some other examples, the resource allocation information for the DL MU transmission 310(2) can be determined from the network status information, and compared to the previous DL MU transmission 310(1).

The previous resource allocation information was a HE-SIG-B field of the previous DL HE MU PPDU frame, and was stored in the AP 101 and the one or more STAs 102. The HE-SIG-B field of the previous DL HE MU PPDU frame may have been stored within the buffer memory 1150 (FIG. 11) in the AP 101 and the one or more STAs 102. As shown in FIG. 5, the buffer memory 1150 is accessed to implement the step 503. In some examples, the previous resource allocation information was stored in the buffer memory 1150 from the last preceding DL MU transmission 310(1), or was stored in the buffer memory 1150 from another previous DL MU transmission 310.

An example DL HE MU PPDU 300(*a*) frame is shown in FIG. 3B, which contains the HE-SIG-B field 3033. The HE-SIG-B field 3033 is shown in greater detail in FIG. 3D. The HE-SIG-B field 3033 contains the resource allocation information that was used for the previous DL MU transmission 310(1).

At step 504, when the previous resource allocation is to be repeated for the DL MU transmission 310(2) ("yes" in FIG. 5), the AP 101 generates the control signal, and populates the indication in the identifier field to indicate that there is no HE-SIG-B field 3033 (or any other resource allocation field). The AP 101 transmits the control signal to each of the selected STAs 102. In an example embodiment, a single broadcast of the control signal is transmitted to the STAs 102. The control signal may be contained in a DL HE MU PPDU frame along with payload data.

Figure 4:
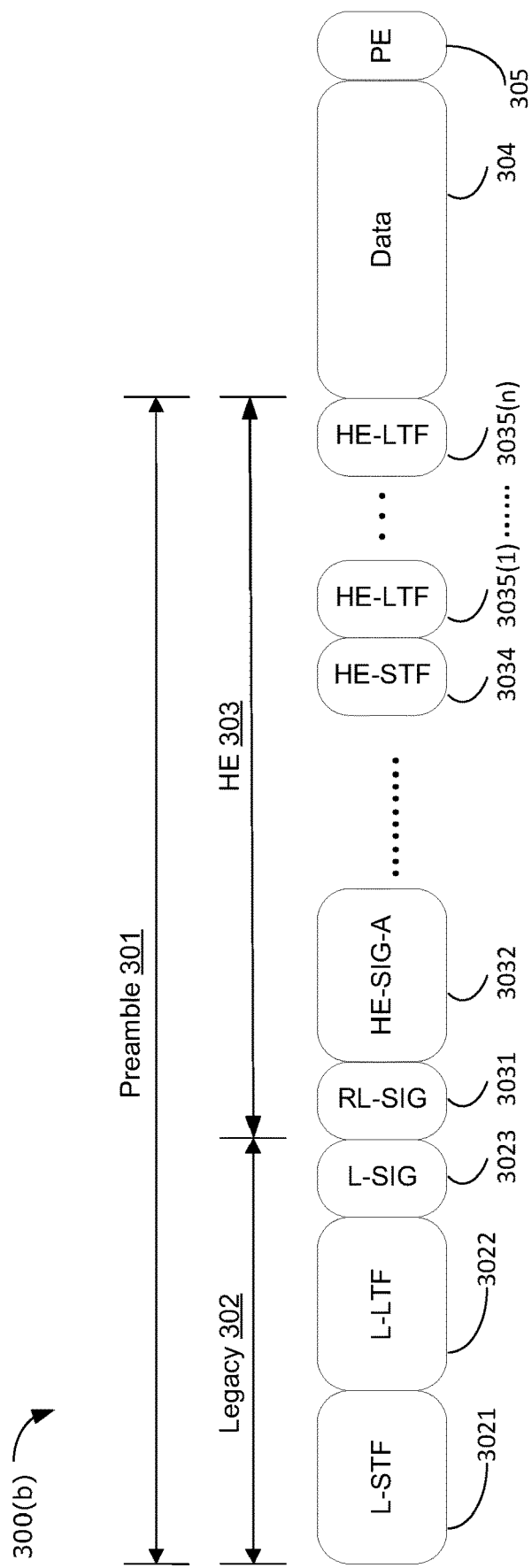
FIG. 4 illustrates an example format of a DL HE MU PPDU frame according to an example embodiment.

FIG. 4 shows a format of the DL HE MU PPDU frame 300(*b*) that is generated at step 504, in accordance with an example embodiment. The same reference numbers are used from the DL HE MU PPDU frame 300(*a*) where appropriate, for convenience of reference. If the previous resource allocation for the DL MU transmission 310(1) is to be repeated, the DL HE MU PPDU frame 300(*b*) of FIG. 4 can be generated by the AP 101. The DL HE MU PPDU frame 300(*b*) has many similar fields with those of the DL HE MU PPDU frame 300(*a*), for example, the DL HE MU PPDU frame 300(*b*) includes a HE-SIG-A field having a HE-SIG-A1 field 3032(*a*) and a HE-SIG-A2 field 3032(*b*). In example embodiments, the DL HE MU PPDU frame 300(*b*) includes an identifier field in the HE-SIG-A1 field 3032(*a*) for indicating that no resource allocation field for the DL MU transmission is included within the DL HE MU PPDU frame 300(*b*). As well, the DL HE MU PPDU frame 300(*b*) has no resource allocation field, as compared to the HE-SIG-B field 3033 shown in FIG. 3B, which carries resource allocation information for the DL MU transmission 310(2).

In example embodiments, the identifier field is the Number of HE-SIG-B Symbols subfield 3044 (FIG. 3C) which is at the B18 to B21 bits of the HE-SIG-A1 field 3032(*a*). The identifier field 3044 can be populated with an indication that indicates that there is no HE-SIG-B field included within the next DL HE MU PPDU frame 300(*b*). For example, the B18 to B21 bits (i.e., the Number of HE-SIG-B Symbols subfield 3044, FIG. 3C) of the HE-SIG-A1 field 3032(*a*) is set to a value of "1111" as the indication to indicate that the next DL HE MU PPDU frame 300(*b*) has no HE-SIG-B field. Note that "1111" has no particular meaning for the Number of HE-SIG-B Symbols subfield 3044 in the conventional case, and so is suitable for being used as the indication in accordance with example embodiments.

At step 505, when the previous resource allocation is not repeated for the DL MU transmission 310(2) ("no" in FIG.

5), a control signal is generated that does not include the indication within the identifier field. The control signal includes a resource allocation field which has the resource allocation information that is used in the DL MU transmission 310(2). The control signal is transmitted (e.g., broadcast) to each of the associated STAs 102. For example, the DL HE MU PPDU frame 300(a) (FIG. 3B) is generated to include the resource allocation field (i.e., HE-SIG-B field 3033), and the DL HE MU PPDU frame 300(a) is transmitted as DL MU transmission 310(2).

In some examples, the AP 101 updates its buffer memory 1150 and stores the resource allocation information (HE-SIG-B field 3033) for the DL MU transmission 310(2) to the buffer memory 1150. As part of or after step 505, the AP 101 stores or replaces the buffer memory 1150 with the resource allocation information, which can be used for future DL MU transmissions 310.

Although FIG. 3A shows a single selected STA 102, the DL MU transmission 310 can be generated and transmitted to a plurality of the selected STA 102.

By determining that resource allocation information is to be repeated for two consecutive DL MU transmissions, the AP 101 can avoid redundant transmitting of resource allocation information. The control signal reduces signaling overhead significantly and provides an available resource for payload data transmissions.

Figure 6:
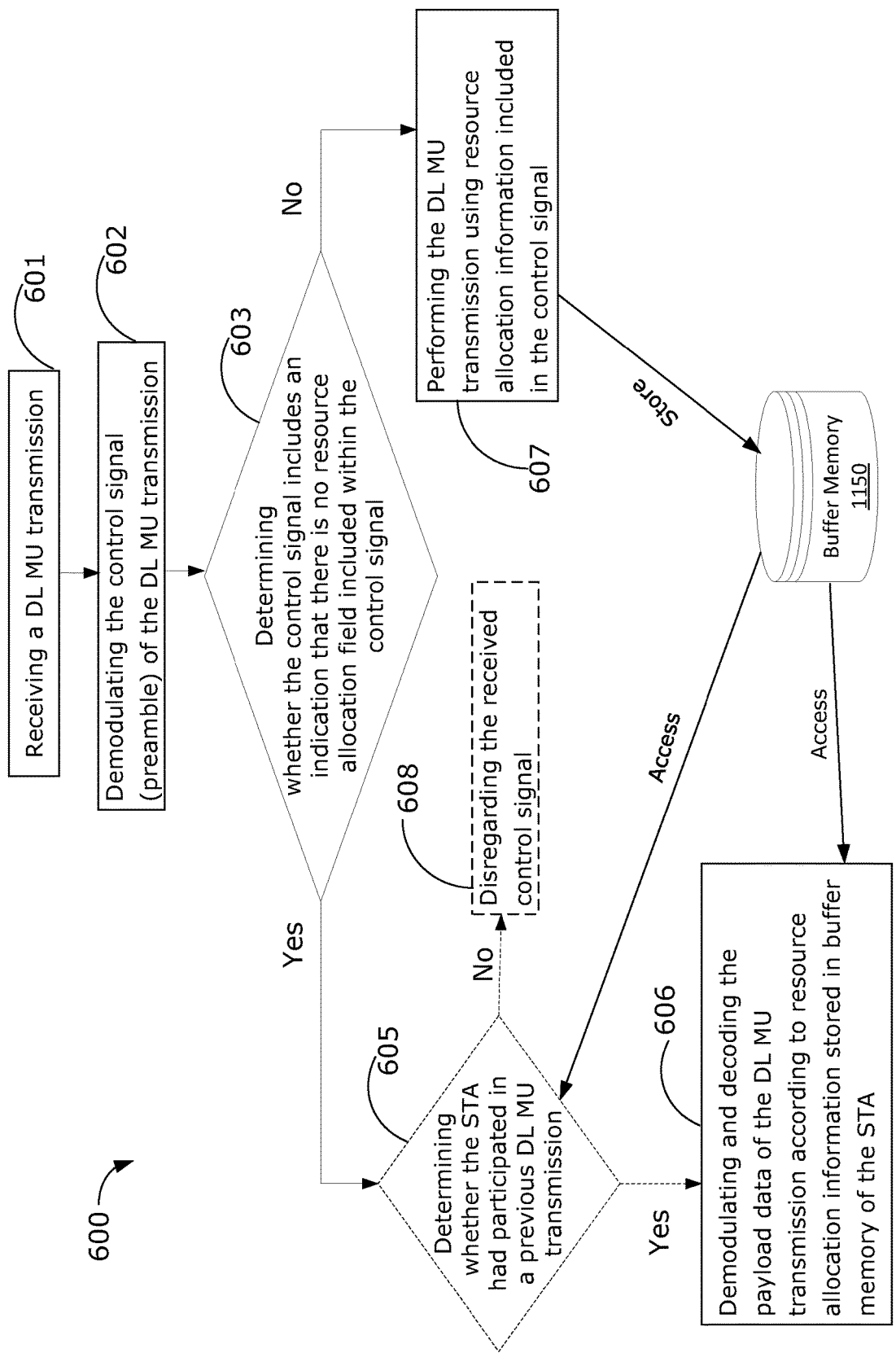
FIG. 6 illustrates an example method implemented by a STA for performing the DL MU transmission, in accordance with an example embodiment.

Reference is now made to FIG. 6, which illustrates a method 600 carried out by one of the selected STAs 102 for performing a DL MU transmission, e.g. DL MU transmission 310(2) (FIG. 3A). At step 601, the STA 102 receives the DL MU transmission 310(2). The DL MU transmission 310(2) includes the control signal (i.e., the preamble) and payload data. In an example embodiment, the STA 102 responds depending on whether the received DL MU transmission 310(2) is the DL MU HE PPDU frame 300(a) (FIG. 3B) or the DL MU HE PPDU frame 300(b) (FIG. 4). At step 602, the STA 102 demodulates the control signal of the DL MU transmission 310(2).

At step 603, the STA 102 determines whether the control signal in the DL MU transmission 310(2) includes the indication in the identifier field, that indicates that there is no resource allocation field included within the control signal, which would mean that resource allocation information from the previous DL MU transmission 310(1) (FIG. 3A) is to be used. For example, after the STA 102 demodulates the preamble (control signal) of the received DL MU HE PPDU frame, the STA 102 checks the value of the B18 to B21 bit positions (Number of HE-SIG-B Symbols subfield 3044, FIG. 3C) of the HE-SIG-A1 field 3032(a) within the received DL MU HE PPDU frame. In some example embodiments, the indication has a value of "1111" to indicate that there is no resource allocation field (no HE-SIG-B field 3033) in the DL MU HE PPDU frame. The indication of "1111" may be set into the B18 to B21 bit position (Number of HE-SIG-B Symbols subfield 3044) of the HE-SIG-A1 field 3032(a). In various other example embodiments, the indication has a value other than "1111", or has more or less bits, or is in different bit positions than B18 to B21.

At step 605, optionally and when the determining at step 603 is "yes", the STA 102 determines whether it had participated in a previous DL MU transmission. For example, the STA 102 may not have been selected by the AP 101 for any previous DL MU transmission. For example, the STA 102 can check its buffer memory 1150 (FIG. 11) to determine if any previous resource allocation information is stored at all. In other example embodiments, the STA 102 can check its buffer memory 1150 (FIG. 11) to determine if there is any previous resource allocation information stored in association with the AP 101.

At step 608, if the STA 102 had not had participated in a previous DL MU transmission ("no" in FIG. 6), the STA 102 disregards the entire DL MU transmission 310(2) and the control signal (preamble) contained therein. For example, if the STA 102 determines that the STA 102 had not participated in the previous DL MU transmission 310(1), the received DL HE MU PPDU frame is disregarded (e.g. ignored, withdrawn, deleted, etc.).

At step 606, if the STA 102 determines that it had participated in a previous DL MU transmission ("yes" in FIG. 6), the STA 102 demodulates and decodes the payload data of the received DL MU transmission, e.g. the data field 304 of the DL MU HE PPDU frame 300(b) (FIG. 4). The payload data is demodulated and decoded according to the previous resource allocation information that was previously stored within the buffer memory 1150 (FIG. 11) of the STA 102. For example, the STA 102 determines that the received DL HE MU PPDU frame includes the indication in the identifier field, which means that the DL HE MU PPDU frame 300(b) does not include a HE-SIG-B field, and therefore the previous resource allocation from the buffer memory 1150 is to be used. The STA 102 demodulates and decodes the payload data of the DL MU transmission 310(2) using the previous resource allocation information, which was the same as the resource allocation information that was used for the previous DL MU transmission 310(1), for example. By receiving the DL HE MU PPDU frame 300(b), instead of the conventional DL HE MU PPDU frame 300(a) that re-sends the entirety of the resource allocation information, resources are saved in the DL MU transmission 310(2).

At step 607, if the indication is not included within the identifier field of the control signal ("no" in FIG. 6), the STA 102 demodulates and decodes the payload data of the DL MU transmission 310(2) using the resource allocation information that is included in the HE-SIG-B field of the preamble of the DL MU transmission 310(2). For example, the indication is not included within the received DL MU HE PPDU frame, as in DL MU HE PPDU frame 300(a) (FIG. 3B). The DL MU HE PPDU frame 300(a) includes a resource allocation field (i.e., a HE-SIG-B field) containing the resource allocation information regarding the DL MU transmission 310(2). After the STA 102 determines that the indication is not included within the DL MU HE PPDU frame 300(a), the resource allocation information of the HE-SIG-B field in the DL MU HE PPDU frame 300(a) may be stored within the buffer memory 1150 (FIG. 11) of the STA 102, to be used for a future DL MU transmission 310. In one example, the received resource allocation information of the HE-SIG-B field can replace any previous resource allocation information of the HE-SIG-B field stored in the buffer memory 1150.

In an example embodiment, the entire HE-SIG-B field 3033 is stored in the buffer memory 1150 (FIG. 11) of the STA 102. In other example embodiments, the part of the HE-SIG-B field 3033 that is stored in the buffer memory 1150 (FIG. 11) is the common field 320, which occupies at most 43 bits, and only the one user specific subfield 3211 that corresponds to this STA 102, which may occupy 21 bits. In some example embodiments, the entire control signal (preamble 301) of the DL MU HE PPDU frame 300(a) is stored by the STA 102 in its buffer memory 1150, for later extraction of the HE-SIG-B field 3033 when needed for a subsequent DL MU transmission.

By making a minor modification to the conventional DL HE MU PPDU frame 300(a) to include the identifier field, and to remove the HE-SIG-B field 3033, network overhead may be decreased substantially in a series of successive DL MU transmissions that require the same resource allocation information. Existing bit positions B18 to B21 (Number of HE-SIG-B Symbols subfield 3044) of the HE-SIG-A1 field 3032(a) are used to provide the identifier field, and so additional bit positions are not required in this example. Moreover, for each STA 102 and the AP 101, it is unnecessary to store the resource allocation information of each received DL MU transmission, which requires less hardware processing costs than in the conventional case. In example embodiments, for example as describe below in relation to an UL MU transmission, the identifier field can be a reserved subfield that is as few as one bit, e.g. "1" for the indication and "0" to indicate otherwise.

Referring again to step 606, note that the resource allocation information stored in the buffer memory 1150 of the STA 102 is not necessarily from the DL MU HE PPDU frame 300(a) of the last preceding DL MU transmission 310(1). In example embodiments, the resource allocation information may have been repeated for many successive DL MU transmissions 310, and therefore the resource allocation information stored in the buffer memory 1150 of the STA 102 may have been received (and stored) from the first of a series of successive DL MU transmissions that all repeat the same resource allocation information.

Referring now to UL MU transmission, the control signal is a trigger frame that can be used to schedule a UL MU transmission and provide resource allocation information for the UL MU transmission. For example, before each STA 102 establishes UL MU transmission with an AP 101, the trigger frame is generated and transmitted from the AP 101 to solicit OFDMA only (without MU-MIMO) transmission or MU-MIMO transmission in the uplink direction, in a designated RU. The trigger frame identifies those STAs 102 participating in the UL MU transmissions and assigns RUs to the STAs 102. The trigger frame is used to inform each participating STA 102 of their resource allocation information. In example embodiments, the trigger frame also carries other information required by each STA 102 to send a multi-user (MU) Physical Layer Convergence Procedure (PLCP) Protocol Data Unit (PPDU) frame, such as a high efficiency (HE) trigger-based (TB) PPDU frame. In response to the trigger frame, each STA 102 may transmit an UL MU PPDU frame, such as the HE TB PPDU frame, to the AP 101 to perform their UL MU transmission.

Figure 7:
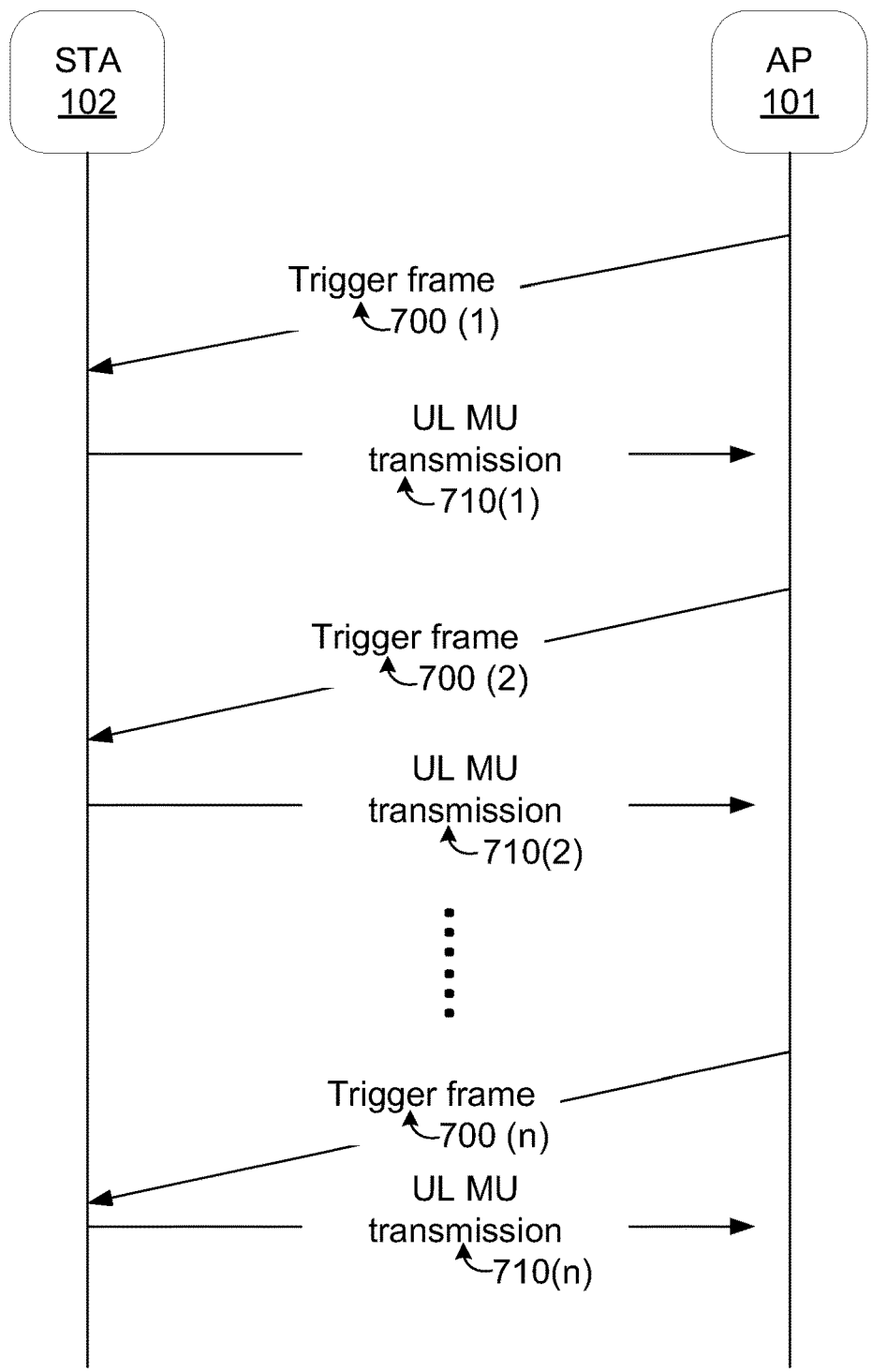
FIG. 7 is a schematic diagram of transmissions between an AP and a STA illustrating successive UL multi-user (MU) transmissions according to example embodiments.

FIG. 7 shows successive (consecutive) UL MU transmissions 710(1), 710(2), ..., to 710(n) (generically referred to as UL MU transmission 710) initiated from an AP 101 and each STA 102 by using respective trigger frames 700(1), 700(2), ..., to 700(n) (generically referred to as trigger frame 700). For ease of illustration, although only one STA 102 is illustrated, in other examples, a plurality of STAs 102 may take part in the UL MU transmissions 710. In some examples, the formats of some of the trigger frames 700 are different. In other examples, the formats of all of the trigger frames 700 are all the same. In other examples, the UL MU transmissions 710 may be initiated by other types of suitable trigger frames and may have other formats of PPDU frames.

In FIG. 7, each UL MU transmission 710 is solicited by a trigger frame 700 from the AP 101. After each associated STA 102 receives the trigger frame 700, the STA 102 may transmit the UL MU transmission 710 using OFDMA only (without MU-M IMO) or OFDMA with MU-M IMO in the UL direction. In some examples, not shown here, after the AP 101 receives a UL MU transmission 710(1) from the STA 102, the AP 101 transmits an Acknowledgement (ACK) to the STA 102, in order to confirm with the STA 102 that the UL MU transmission 710(1) has been received successfully. Before the AP 101 transmits each of the trigger frames 700(2). 700(n) to the STA 102. the AP 101 may transmit an ACK which indicates that the last preceding UL MU transmission 710 has been received successfully.

Reference is now made to FIG. 8A, which illustrates a conventional format of a trigger frame 800(a) as defined in PHY 802.11ax for initiating UL transmissions. The trigger frame 800(a) includes a frame control field 801, a duration field 802, a receiver address (RA) field 803, a transmitter address (TA) field 804, a common information (Common Info) field 805, a plurality of User Information (User Info) fields 806(1) to 806(n) (generically referred to User Info field 806), a padding field 807, and a frame check sequence (FCS) 808. The RA field 803 indicates addresses of recipient STAs. The TA field 804 indicates an address of the AP 101 that is transmitting the trigger frame 800. Examples of the Common Info field 805 and the Data field 804 are further described in greater detail below.

FIG. 8B shows an example format of the Common Info field 805, which may occupy B0 to B63 bit positions. The Common Info field 805 includes a trigger type subfield 8051, a length subfield 8052, a more trigger frame (TF) subfield 8053, a CS required subfield 8054, a HE-SIG-A reserved subfield 8055, a reserved subfield 8056 (bit position B63), and a trigger dependent common information subfield 8057. The trigger type subfield 8051 identifies the trigger frame variant. The length subfield 8052 of the Common Info field 805 indicates the value of the L-SIG Length field of the HE TB PPDU that is the response to the trigger frame. The more TF subfield 8053 of the Common Info field 805 is set to 1 to indicate that a subsequent trigger frame is scheduled for transmission. The reserved subfield 8056 occupies the bit position B63 that can be used as the identifier field in accordance with example embodiments, for indicating that previous resource allocation information from the last preceding UL MU transmission 710 is to be repeated.

Figure 8C:
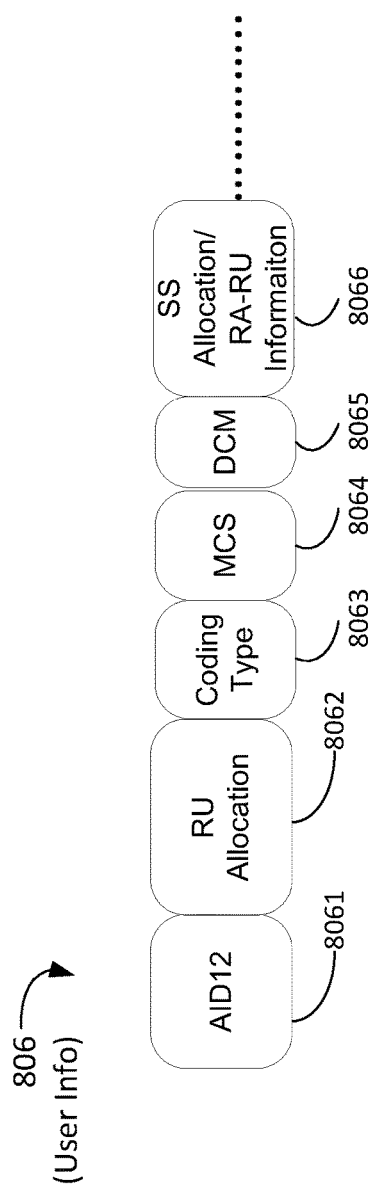
FIG. 8C is one User Info field of the trigger frame of FIG. 8A.

With reference to FIG. 8C, each User Info field 806 is a resource allocation field that includes resource allocation information for the UL MU transmission. The User Info field 806 includes a 12 least significant bits (LSBs) of an application identifier (AID12) subfield 8061, a resource unit (RU) allocation subfield 8062, a Coding Type subfield 8063, a modulation and coding scheme (MCS) subfield 8064, a dual carrier modulation (DCM) subfield 8065, a spatial streams (SS) allocation/random access resource unit (RA-RU) information 8066. The RU allocation subfield 8062 indicates the RUs used by the HE TB PPDU of a STA identified by the AID12 subfield 8061. The Coding type subfield 8063 indicates the code type of the HE TB PPDU. The Coding Type subfield is set to 0 to indicate BCC and set to 1 to indicate LDPC. The MCS subfield 8064 of the User Info field indicates the modulation and coding scheme of the HE TB PPDU frame. The DCM subfield 8065 indicates dual carrier modulation of the HE TB PPDU frame 800. The DCM subfield 8064 is set a value to indicate whether DCM is used in the HE TB PPDU. The DCM subfield 8065 is set to 1 to indicate DCM is used in the HE TB PPDU frame. The DCM subfield 8065 is set to 0 to indicate that DCM is not used. The SS Allocation/RA-RU Information subfield 8066 indicates the spatial streams or random access resource units of the HE TB PPDU frame.

In the conventional case, the AP 101 transmits the trigger frame 800(*a*) (FIG. 8A) to each STA 102 to solicit each UL MU transmission. The trigger frame 800(*a*) may be a waste of resources and network overhead to inform each STA 102 of resource allocation information in each trigger frame 800(*a*). Example embodiments of the AP 101 can generate and transmit the trigger frame 800(*b*) (FIG. 8D) with the identifier field that includes the indication for indicating that no resource allocation information is included in the trigger frame 800(*b*).

Figure 9:
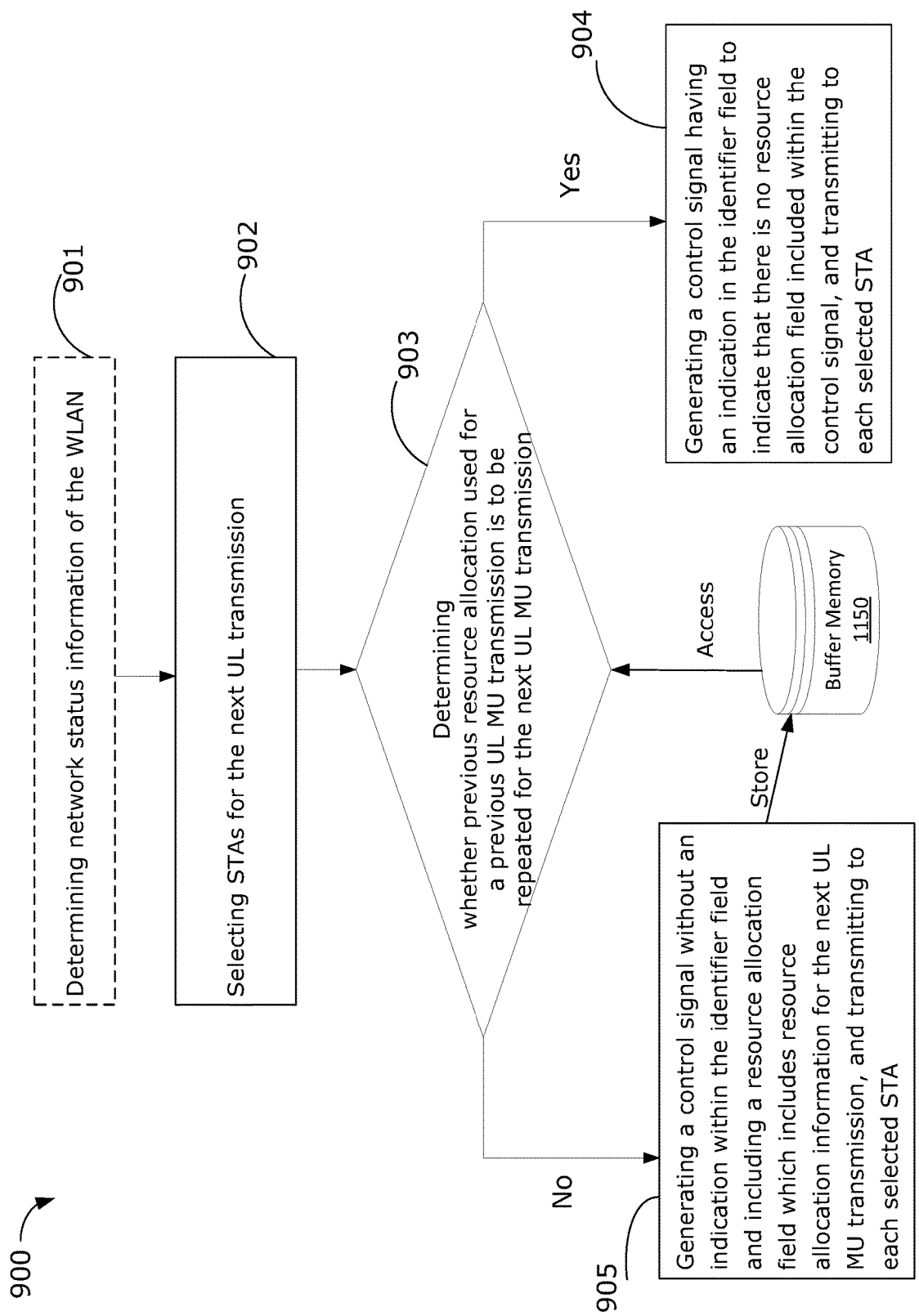
FIG. 9 illustrates an example method implemented by an AP for initiating an UL MU transmission according to an example embodiment.

FIG. 9 illustrates a method 900 to generate the trigger frame to solicit the next UL MU transmission, e.g. the UL MU transmission 710(2) (FIG. 7). In response to each trigger frame, the STAs 102 transmit their UL MU transmission 710(2) in the form of a HE TB PPDU frame to the AP 101.

At step 901, optionally, the AP 101 determines network status information of the WLAN. The AP 101 receives status information from each STA 102 in order to determine the network status information. The network status information includes transmission channel conditions and traffic needs of the WLAN. For example, the AP 101 determines which STAs 102 are associated with the AP 101, in which frequency channels and spatial streams to transmit payload data, which STAs 102 need to establish UL transmission, the payload data size of each STA 102, and so on. At step 902, the AP 101 selects which STAs 102 are to transmit the UL MU transmission. For example, the network status information is used by the AP 101 to select the STAs 102.

At step 903, the AP 101 determines whether previous resource allocation used for the last preceding UL MU transmission 710(1) is to be repeated for the UL MU transmission 710(2). For example, when the selected STAs 102 and their respective spatial positions are the same as in the UL MU transmission 710(1), the previous resource allocation of the UL MU transmission 710(1) is to be repeated. In some other examples, the AP 101 determines resource allocation information for the UL MU transmission 710(2) from the determined network status information, and compares with the previous resource allocation information to see if they are identical.

In some examples, the previous resource allocation information is found in each User Info field 806 of the previous trigger frame 700(1) that was used for the previous UL MU transmission 710(1). In some examples, the previous resource allocation information was stored within the buffer memory 1150 (FIG. 11) in the AP 101 and the STA 102.

At step 904, when the previous resource allocation information is to be repeated for the UL MU transmission 710(2) ("yes" in FIG. 9), the AP 101 generates the trigger frame to include the indication in the identifier field, to indicate that there is no User Info field 806. The trigger frame is then transmitted to each of the selected STAs 102.

Figure 8D:
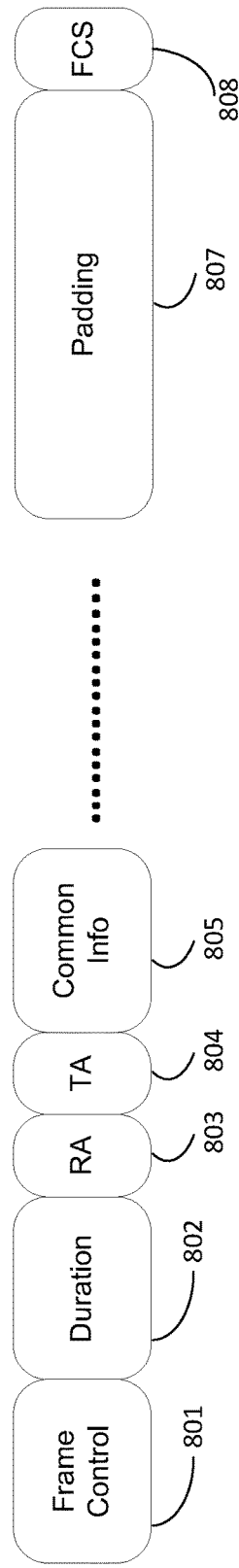
FIG. 8D is an example format of a trigger frame of FIG. 8A according to an example embodiment.

FIG. 8D shows a format of the trigger frame 800(*b*) in accordance with an example embodiment. If the previous resource allocation information from the previous UL MU transmission 710(1) is to be repeated for the UL MU transmission 710(2), the AP 101 generates the trigger frame 800(*b*), and transmits (e.g. broadcasts) the trigger frame 800(*b*) to the selected STAs 102. The trigger frame 800(*b*) has many similar fields as the conventional trigger frame 800(*a*) (FIG. 8A), for example, the trigger frame 800(*b*) also includes a Common Info subfield 805. However, the trigger frame 800(*b*) has no User Info fields 806 (FIG. 8A), which conventionally carry resource allocation information for the UL MU transmission 710(2). In example embodiments, the generated trigger frame 800(*b*) includes an identifier field in the Common Info subfield 805 for indicating that there are no User Info fields 806 in the trigger frame 800(*b*).

In some examples, the identifier field is reserved bit position B63 of the Common Info field 805, i.e., the reserved subfield 8056 of the Common Info field 805, FIG. 8B). The identifier field can include an indication to indicate that there is no User Info field included within the trigger frame 800(*b*). For example, the B63 of the Common Info field 805 has an indication of "1" to indicate that the generated trigger frame 800(*b*) has no User Info field 806. In some examples, a broadcast address may be set into the RA field 803.

At step 905, when the previous resource allocation information for the UL MU transmission 710(1) is not to be repeated for the UL MU transmission 710(2) ("no" in FIG. 9), the AP 101 generates the trigger frame 700(2) without the indication. The trigger frame 700(2) includes the resource allocation field containing the resource allocation information for the UL MU transmission 710(2), and the trigger frame 700(2) is transmitted to each of the associated STAs 102. The B63 of the Common Info field 805 is set to "0", rather than "1". The value of "0" is used to indicate that there are User Info fields 806 within the trigger frame 700(2). The User Info fields 806 indicate the resource allocation information for the UL MU transmission 710(2). In some other examples, the AP 101 updates its buffer memory 1150 (FIG. 11) with the resource allocation information (User Info fields 806) for the UL MU transmission 710(2).

In some other examples, the AP 101 may broadcast successive trigger frames 700 to one or more of the STAs 102 to solicit UL MU transmissions. Although FIG. 7 shows a single selected associated STA 102, the trigger frames 700 can be transmitted to all of the selected associated STAs 102. When resource allocation information of the last preceding UL MU transmission 710(1) is to be repeated for a subsequent UL MU transmission (710(2)), the AP 101 generates and transmits the trigger frame 700(2) to include the indication in the identifier field, instead of including repeated resource allocation information within the trigger frame 700(2) for the subsequent UL MU transmission (710(2)). The use of the identifier field within the trigger frame 700(2) helps to provide more available resources for payload data transmission and to improve transmission efficiency.

By making a minor change to a conventional trigger frame 800(*a*) to provide the identifier field, network overhead may be decreased substantially. The reserved bit position only requires 1 bit to provide the identifier field, versus the plurality of bits required for the conventional User Info fields 806.

Figure 10:
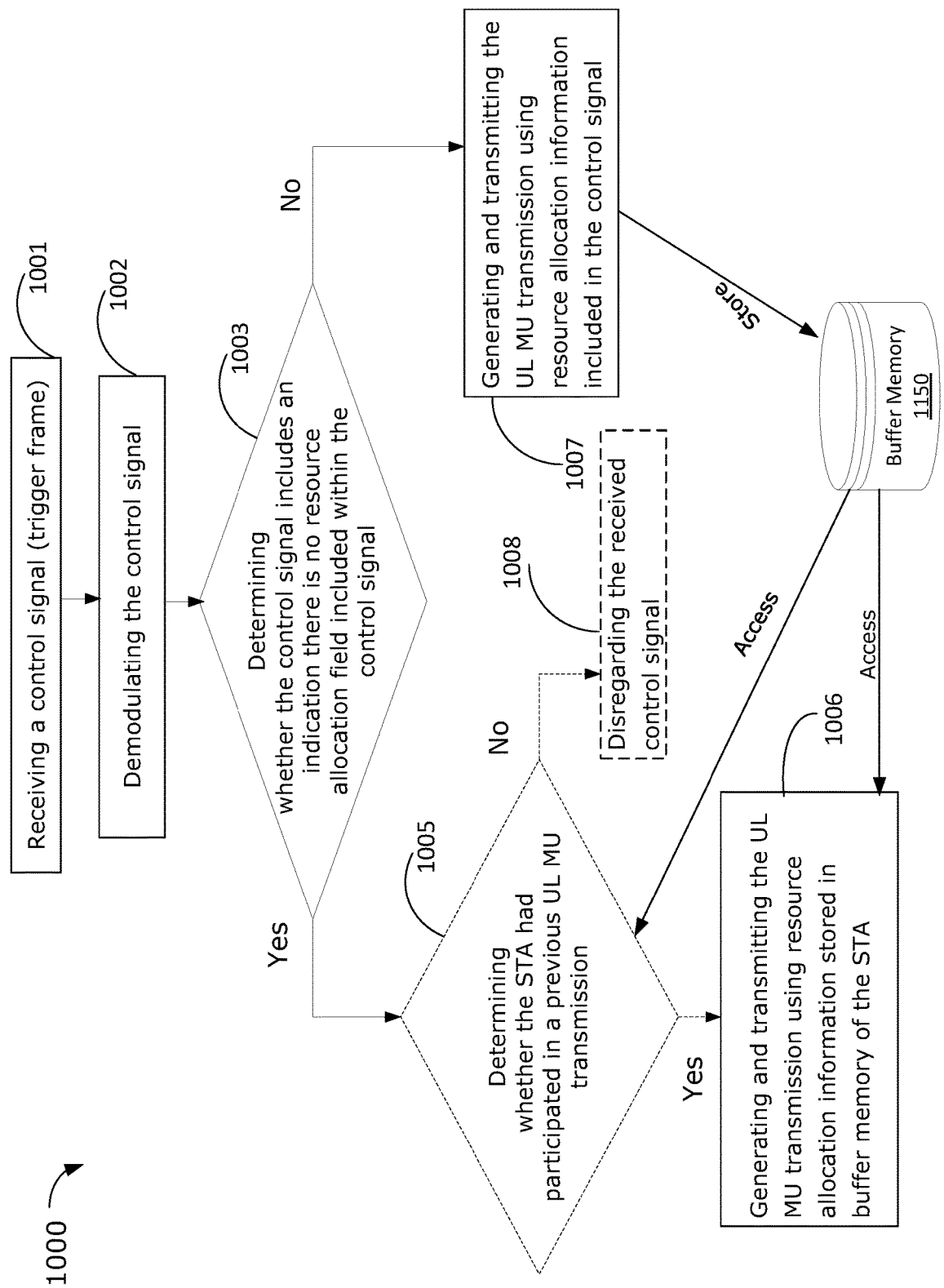
FIG. 10 illustrates an example method implemented by a STA for performing the UL MU transmission according to an example embodiment.

FIG. 10 illustrates a method 1000 implemented by one of the selected STAs 102 for receiving the control signal transmitted by the AP 101 to perform an UL MU transmissions. At step 1001, the STA 102 receives a control signal in the form of a trigger frame which solicits for the UL MU transmission 710(2) (for example). The STA 102 responds in dependence on whether the received trigger frame is the trigger frame 800(*a*) (FIG. 8A) or the trigger frame 800(*b*) (FIG. 8D). In some other examples, the UL MU transmission 710(2) may be an UL MU PPDU transmission. At step 1002, the STA 102 demodulates the trigger frame (control signal).

At step 1005, the STA 102 determines whether the control signal includes an indication in the identifier field, which indicates that there is no resource allocation field included within the control signal. For example, after the STA 102 demodulates the received trigger frame, the STA 102 checks value of the B63 of the Common Info field 805 within the received trigger frame. In some examples, the identifier field has a value of "1" to indicate that there is no resource allocation field (such as a plurality of User Info fields 806) for the UL MU transmission 710(2). In some other examples, the indication for the identifier field has a value other than "1", such as "0".

At step 1005, optionally, if the indication is included within the control signal ("yes" in FIG. 10), the STA 102 determines whether it had participated in a previous UL MU transmission (e.g. UL HE MU PPDU transmission 710(1)), for example by checking the buffer memory 1150 of the STA 102.

At step 1008, optionally, if "no", the STA 102 disregards the received control signal. If the STA 102 determines it does not participate in the previous UL MU transmission 710(1), the received trigger frame is disregarded. The STA 102 may perform no more further functions in relation to the trigger frame or the UL MU transmission 710(2).

At step 1006, if the indication is included within the control signal (trigger frame), the STA 102 will perform the UL MU transmission 710(2) using previous resource allocation information that was previously stored within the buffer memory 1150 of the STA 102. The received trigger frame may have a format of the trigger frame 800(b) (FIG. 8D). In some examples, the previous resource allocation information may have been stored within the STA's buffer memory 1150 (FIG. 11) as part of performing the previous UL MU transmission 710(1). The STA 102 determines that the received trigger frame 800(b) includes the indication in the identifier field, which means that the received trigger frame does not include the plurality of User Info fields 806. The B63 of the Common Info field 805 of the trigger frame 800(b) has a value of "1", for indicating that there is no resource allocation field (plurality of User Info fields 806) within the trigger frame 800(b). The STA 102 performs the UL MU transmission 710(2) in response to the trigger frame 800(b) in accordance with the previous resource allocation information which was used for the previous UL MU transmission 710(1). Receiving the trigger frame 800(b) for soliciting the UL MU transmission 710(2) reduces repeating of resource allocation information within the trigger frames of the UL MU transmissions 710.

At step 1007, if the indication is not included within the control signal ("no" in FIG. 10), the STA 102 performs the subsequent UL MU transmission in response to the received trigger frame using the resource allocation information that is included in the control signal. If the indication is not included within the received trigger frame, for example, the B63 of the Common Info field 805 of the received trigger frame has a value other than "1" (being "0"), the received trigger frame is the trigger frame 800(b) shown in FIG. 8D, which includes a resource allocation field containing the resource allocation information to be used for the UL MU transmission 710(2). The UL MU transmission 710(2) is generated by the STA 102 and transmitted by the STA to the AP 101.

Optionally, after the STA 102 determines that the indication is not included within the trigger frame 800(b), information of the plurality of User Info field 806 in the trigger frame 800(b) for the UL MU transmission 710(2) may be updated and stored within the buffer memory 1150 (FIG. 11) of the STA 102.

In an example embodiment, all of the user info sub-fields 806 are stored in the buffer memory 1150 (FIG. 11) of the STA 102. In other example embodiments, only one user info subfield (e.g. 806(1)) that corresponds to this STA 102 is stored in the buffer memory 1150. In some example embodiments, the entire control signal of the UL MU HE PPDU frame 800(a) is stored by the STA 102 in its buffer memory 1150.

By modifying the frame format of conventional trigger frames 800(a) to indicate whether previous resource allocation information for a UL MU transmission is to be repeated, duration of the trigger frames may be decreased for each UL MU transmission. Such a modification requires negligible changes of the conventional trigger frame 800(a) or any network operational modes in wireless communication systems. Moreover, for each STA 102 and the AP 101, it is unnecessary to store the resource allocation information from each trigger frame, which may reduce processing resources of each STA 102 and the AP 101.

Figure 11:
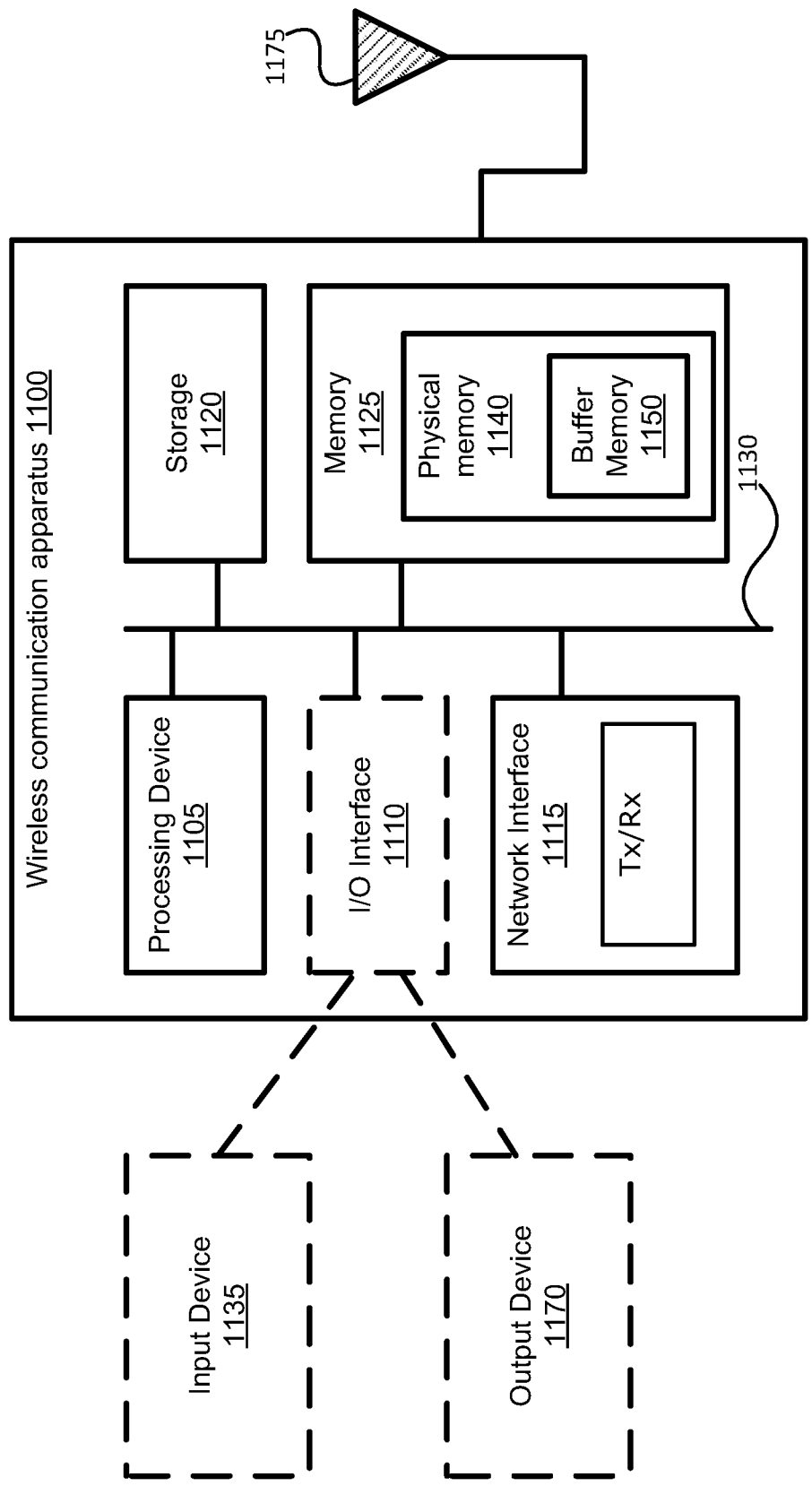
FIG. 11 is a schematic representation of an example wireless communication apparatus used for the successive DL or UL MU transmissions according to example embodiments.

FIG. 11 is a schematic diagram of an example wireless communication apparatus 1100, in accordance with example embodiments. For example, the wireless communication apparatus 1100 may be the AP 101 or the STA 102. Although FIG. 11 shows a single instance of each component, there may be multiple instances of each component in the wireless communication apparatus 1100 and the wireless communication apparatus 1100 can be implemented using parallel and distributed architecture.

The wireless communication apparatus 1100 may include one or more processing devices 1105, such as a processor, a microprocessor, an application-specific integrated circuit (ASIC), a field-programmable gate array (FPGA), a dedicated logic circuitry, or combinations thereof. The wireless communication apparatus 1100 may also include one or more optional input/output (I/O) interfaces 1110, which may enable interfacing with one or more optional input devices 1135 and output devices 1170. The wireless communication apparatus 1100 may include one or more network interfaces 1115 for wired or wireless communication with a network (e.g., an intranet, the Internet, a P2P network, a WAN, a LAN, or a Radio Access Network (RAN)) or other node. Wireless networks may make use of wireless connections transmitted over an antenna 1175. The network interface(s) 1115 may provide multiple access wireless communication via one or more transmitters or transmit antennas and one or more receivers or receive antennas, for example. In this example, one antenna 1175 is shown, which may serve for multiple access transmission. However, in other examples there may be multiple antennas for transmitting and receiving. In some examples, an antenna array may be used. The wireless communication apparatus 1100 may also include one or more storage units 1120, which may include a mass storage unit such as a solid state drive, a hard disk drive, a magnetic disk drive or an optical disk drive.

The wireless communication apparatus 1100 may include one or more memories 1125 that can include physical memory 1140, which may include a volatile or non-volatile memory (e.g., a flash memory, a random access memory (RAM), or a read-only memory (ROM)). The physical memory 1140 includes a buffer memory 1150. The non-transitory memory 1125 (as well as storage unit(s) 1120) may store instructions for execution by the processing device(s) 1105, such as to carry out processing as described in the present disclosure. The memory 1125 may include other software instructions, such as for implementing an operating system (OS), and other applications/functions. In some examples, one or more data sets or modules may be provided by an external memory (e.g., an external drive in wired or wireless communication with the wireless communication apparatus 1100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 1130 providing communication among components of the wireless communication apparatus 1100. The bus 1130 may be any suitable bus architecture including, for example, a memory bus, a peripheral bus or a video bus. Optional input device(s) 1135 (e.g., a keyboard, a mouse, a microphone, a touchscreen, or a keypad) and optional output device(s) 1170 (e.g., a display, a speaker or a printer) are shown as external to the wireless communication apparatus 1100, and connected to optional I/O interface 1110. In other examples, one or more of the input device(s) 1135 and the output device(s) 1170 may be included as a component of the wireless communication apparatus 1100.

The wireless communication apparatus 1100 may be the AP 101 or the STA 102 as described above.

Embodiments in which wireless communication apparatus 1100 is an AP 101 will now be described with reference to FIG. 11. The AP 101 may transmit a control signal to schedule successive DL MU transmissions or UL MU transmissions to a STA 102 via the multiple antenna 1175 associated with the wireless communication apparatus 1100. The processing device 1105 may carry out the steps or steps described herein, such as including resource allocation information, by executing instructions stored in the storage unit(s) 1120 or memory 1125.

Example embodiments in which wireless communication apparatus 1100 is a STA 102 will now be described with reference to FIG. 11. The STA 102 is configured for receiving the control signal from the AP 101 via the antenna 1175 associated with the wireless communication apparatus 1100. The processing device 1105 may implement subsequent UL or MU transmissions via the multiple antennas 1175 associated with the wireless communication apparatus 1100 in accordance with received control signal, which may be stored in the storage unit(s) 1120 or memory 1125.

In at least some examples, instructions that cause the processing device 1105 to carry out the methods shown in FIGS. 5 and 9 are stored in storage unit(s) 1120 or memory 1125 of the wireless communication apparatus 1100. In example embodiments, instructions that cause the processing device 1105 to carry out the methods shown in FIGS. 6 and 10 are stored in storage units 720 of the wireless communication apparatus 1100, such as a STA.

In at least some examples, the buffer memory 1150 is used for storing resource allocation information that was used for a previous UL or DL MU transmission. For example, with respect to DL MU transmission, the buffer memory 1150 of the AP 101 may have a size to store the entire HE-SIG-B field 3033 (such as shown FIG. 3D) that was used in the previous DL MU transmission. The entire HE-SIG-B field 3033 includes the common field 401 having at most 43 bits, and a User Specific field 321 including a plurality of user specific subfields 3211 for all associated STAs, which occupies at most 9×21 bits. Therefore, the buffer memory 1150 of the AP 101 may have a size of at most 232 bits allocated to store resource allocation information regarding the previous DL MU transmission. In some examples, the buffer memory 1150 of the STA 102 may have a size to store part (one or more subfields) of the HE-SIG-B field 3033 that was used to indicate previous resource allocation information to support previous DL MU transmission as shown FIG. 4. The part of the HE-SIG-B field 3033 may include the common field 401 having at most 43 bits, and one user specific subfield 3211 corresponding to the STA occupying 21 bits.

In some examples, the buffer memory 1150 of the STA 102 may have a size of at most 64 bits allocated to store the common field 401 and one user specific subfield 3211. In some examples, the buffer memory 1150 may not necessarily have a fixed size, and can have a dynamic size with dynamically allocated memory. In example embodiments, there are two separate buffer memories 1150 allocated in the physical memory 1140. one for storing resource allocation information for the UL MU transmission, and one for storing resource allocation information for the DL MU transmission.

In some example embodiments, with respect to UL MU transmission, the buffer memory 1150 of the AP 101 may have a size to store a plurality of User Info fields 806 (such as shown FIG. 8A) that was used in the previous UL MU transmission. In some other examples, the buffer memory 1150 of the STA 102 may have a size to store at least one resource allocation field (or at least some of the resource allocation information), from the plurality of User Info fields 806 as shown FIG. 8A. In this example, the stored resource allocation field may include one User field 806 corresponding to the STA, which occupies 5 or more bits. Therefore, the buffer memory 1150 of the AP 101 may have a size allocated to store the resource allocation information regarding to the previous UL MU transmission. In other examples, the buffer memory 1150 of the STA 102 may have a size allocated to store the resource allocation information corresponding to the STA 102 regarding to the previous UL MU transmission. The buffer memory 1150 may not necessarily have a fixed size, and can have a dynamic size in some examples.

In some examples, the buffer memory 1150 is used to store the resource allocation information of one previous MU transmission. When there is new (different) received resource allocation information, that resource allocation information replaces and overwrites the previous information stored in the buffer memory 1150. In another example embodiment, the buffer memory 1150 is used to store a specified number of previous resource allocation information. In another example embodiment, the buffer memory 1150 is used to store all previous resource allocation information in association with all MU transmissions in the current session between the AP 101 and the STA 102. In various example embodiments, the buffer memory 1150 in the STA 102 is cleared by the processing device 1105 each time the STA 102 establishes a new session with an AP 101. In various example embodiments, the buffer memory 1150 in the AP 101 is cleared by the processing device 1105 each time the AP 101 has a new STA 102 associated with the network. The buffer memory 1150 may also be cleared during power down, power on, etc., of the wireless communication apparatus 1100.

The example methods and systems for scheduling successive DL or UL MU transmissions between an AP and at least one STAs may assist to provide more flexibility for successive DL or UL MU transmissions. A control signal may be generated and transmitted that has reduced duration and bit length versus the control signal in conventional cases, which can enable the successive DL or UL MU transmissions to be implemented with reduced resources. Moreover, repeated transmitting of resource allocation information may be avoided because the indication in the identifier field is used to inform each STA that previous resource allocation information is used to perform the DL or UL MU transmission, which may help to reduce network overhead that would otherwise be used for distribution the resource allocation information.

In various examples, more spare resources may be made available, which can be used for payload data transmission and other wireless traffic. The AP and the STAs can use stored resource allocation information that was used for the previous DL or UL MU transmissions instead of transmitting resource allocation information for each transmission, which may increase the overall efficiency of the WLAN as well as improve traffic flow and channel access.

Although example embodiments have been described with respect to multi-user transmissions, other example embodiments can be applied to single-user (SU) transmissions and related protocols, as applicable.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method for scheduling wireless transmissions, performed by an access point (AP), the method comprising:
   determining that a previous resource allocation used for a previous transmission is to be repeated for a multi-user (MU) downlink transmission;
   generating a control signal for the MU downlink transmission excluding a high efficiency (HE) signal-B (SIG-B) field, the control signal including an indication that there is no HE SIG-B field within the control signal, wherein the indication is included in a HE signal-A (SIG-A) field of the control signal; and
   transmitting the control signal within which the HE SIG-B field is excluded.

2. The method of claim 1, wherein resource allocation information for the previous resource allocation was transmitted by the AP in a previous control signal.

3. The method of claim 2, wherein the resource allocation information includes resource assignment parameters and transmission parameters.

4. The method of claim 1, wherein the transmission includes the control signal and payload data.

5. The method of claim 1, further comprising receiving the transmission and demodulating and decoding the transmission according to the previous resource allocation.

6. The method of claim 1, wherein the transmission is a downlink (DL) high efficiency (HE) Physical Layer Convergence Procedure (PLCP) Protocol Data Unit (PPDU) frame, wherein the DL HE PPDU frame includes the control signal, and wherein the indication is for indicating that there is no HE SIG-B field in the DL HE PPDU frame.

7. The method of claim 6, wherein the AP includes a memory for storing resource allocation information for the previous resource allocation, the resource allocation information being from a HE-SIG-B field of the previous transmission.

8. The method of claim 1, wherein the indication is in bit positions 18 to 21 of the HE SIG-A field.

9. The method of claim 8, wherein the indication in the bit positions 18 to 21 is "1111".

10. The method of claim 1, wherein transmitting the control signal comprises broadcasting the control signal.

11. A method for wireless transmissions, performed by a station (STA), the STA including a memory for storing previous resource allocation information used for a previous transmission, the method comprising:
    receiving a control signal within which a high efficiency (HE) signal-B (SIG-B) field is excluded from an access point (AP), the control signal including an indication that there is no HE SIG-B field within the control signal, wherein the indication is included in a HE signal-A (SIG-A) field of the control signal; and
    performing a multi-user (MU) downlink transmission excluding the HE SIG-B field according to the previous resource allocation information stored in the memory.

12. The method of claim 11, wherein the memory is for storing the previous resource allocation information from one or more sub-fields of a HE SIG-B field of the previous transmission.

13. The method of claim 11, wherein the memory is for storing the previous resource allocation information from one user specific subfield of a HE-SIG-B field of the previous transmission, wherein the one user specific subfield provides resource allocation information specifically for the STA and not any other user specific subfields.

14. A wireless communication apparatus, comprising:
    a transmitter;
    a processing device;
    a memory associated with the processing device for storing previous resource allocation information used for a previous transmission, the memory storing instructions that when executed by the processing device causes the processing device to:
    determine that previous resource allocation information used for a previous transmission is to be repeated for a multi-user (MU) downlink transmission,
    generate a control signal for the MU downlink transmission excluding a high efficiency (HE) signal-B (SIG-B) field, the control signal including an indication that there is no HE SIG-B field within the control signal, wherein the indication is included in a HE signal-A (SIG-A) field of the control signal, and
    transmit the control signal within which the HE SIG-B field is excluded.

15. The wireless communication apparatus of claim 14, wherein the transmission is a high efficiency (HE) Physical Layer Convergence Procedure (PLCP) Protocol Data Unit (PPDU) frame that includes the control signal, wherein the previous resource allocation information is from a HE SIG-B field of the previous transmission.

16. A wireless communication apparatus, comprising:
a processing device;
a memory associated with the processing device for storing previous resource allocation information used for a previous transmission, the memory storing instructions that when executed by the processing device causes the processing device to:
receive a control signal within which a high efficiency (HE) signal-B (SIG-B) field is excluded from an access point (AP), the control signal including an identifier field,
determine that the identifier field of the control signal includes an indication that there is no HE SIG-B field within the control signal, wherein the identifier field is included in a HE signal-A (SIG-A) field of the control signal, and
perform a multi-user (MU) downlink transmission excluding the HE SIG-B field according to the previous resource allocation information stored in the memory that was used for the previous transmission.

\* \* \* \* \*

UNITED STATES PATENT AND TRADEMARK OFFICE
CERTIFICATE OF CORRECTION

PATENT NO. : 10,716,119 B2
APPLICATION NO. : 16/029907
DATED : July 14, 2020
INVENTOR(S) : Hao Li et al.

It is certified that error appears in the above-identified patent and that said Letters Patent is hereby corrected as shown below:

In the Specification

In Column 6, Line 18 "The proposed IEEE 802.11 lax standard introduces a" should read --The proposed IEEE 802.11ax standard introduces a--.

In Column 13, Line 66 "(without MU-M IMO) or OFDMA with MU-M IMO in the" should read --(without MU-MIMO) or OFDMA with MU-MIMO in the--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*